(12) United States Patent
Aizawa et al.

(10) Patent No.: US 6,384,587 B2
(45) Date of Patent: May 7, 2002

(54) NON-CONTACT SIGNAL AND POWER TRANSMISSION APPARATUS

(76) Inventors: Jyunichi Aizawa; Munehisa Takeda; Takeshi Araki; Yoshihiro Obata, all of c/o Mitsubishi Denki Kabushiki Kaisha, 2-3, Marunouchi 2-chome, Chiyoda-ku, Tokyo 100-8310 (JP)

( * ) Notice: Subject to any disclaimer, the term of this patent is extended or adjusted under 35 U.S.C. 154(b) by 0 days.

(21) Appl. No.: 09/795,322

(22) Filed: Mar. 1, 2001

(30) Foreign Application Priority Data

Apr. 27, 2000 (JP) ........................................ 2000-127292

(51) Int. Cl.[7] .......................... H01F 17/00; H01F 19/00; H01F 27/24
(52) U.S. Cl. ........................................ 323/355; 323/362
(58) Field of Search ................................. 323/355, 356, 323/362, 363

(56) References Cited

U.S. PATENT DOCUMENTS

| B14,837,556 A | 6/1989 | Matsushita et al. | |
|---|---|---|---|
| 5,053,774 A | * 10/1991 | Schuermann et al. | ......... 342/44 |
| B25,229,652 A | 7/1993 | Hough | |
| 5,354,975 A | * 10/1994 | Ishibashi et al. | ............. 235/380 |
| 5,444,448 A | * 8/1995 | Schuermann et al. | ......... 342/42 |
| 5,513,383 A | * 4/1996 | Tsao | ............................ 455/89 |
| 6,073,856 A | * 6/2000 | Takahashi | ................... 235/492 |
| 6,198,382 B1 | * 3/2001 | Berger et al. | ............ 340/10.34 |

FOREIGN PATENT DOCUMENTS

| JP | 9-26834 | 1/1997 | ............. G06F/1/00 |
|---|---|---|---|
| JP | 9-213550 | 8/1997 | ........... H01F/38/14 |

* cited by examiner

*Primary Examiner*—Bao Q. Vu

(57) ABSTRACT

Non-contact signal transmission apparatus provides signal transmission between a main unit and an auxiliary unit via electromagnetic induction. A set of power cores having hollow sections are provided as a pair at corresponding positions of the main unit and the auxiliary unit. A wire is wound around each of the power cores as power coils for feeding power from the main unit to the auxiliary unit. At least one set of signal cores are provided as a pair at corresponding positions of the main unit and the auxiliary unit. A wire is wound around each of signal cores as signal coils transmitting signals between the main unit and the auxiliary unit. The signal coils are arranged in hollow sections of the power cores.

11 Claims, 25 Drawing Sheets

MAIN UNIT

AUXILIARY UNIT

MAIN UNIT

AUXILIARY UNIT

NON-CONTACT SIGNAL AND POWER TRANSMISSION APPARATUS

BACKGROUND OF THE INVENTION

The present invention relates to non-contact signal transmission apparatus that transmits power and signals in the non-contact state via the action of electromagnetic induction between a main unit and an auxiliary unit, with the auxiliary unit such as a camera being detachably attached to the main unit such as a portable information terminal that may be a cellular phone or a portable personal computer, a game machine, an AV unit, a medical unit, an industrial unit, or an environment monitoring unit.

While a cellular phone integral with a camera has been conventionally available as a portable information terminal, a cellular phone with a camera detachably attached has rarely been available.

A conventional technology for transmitting power and data via electromagnetic induction in a portable personal computer is disclosed in the Unexamined Japanese Patent Application Publication Hei 9-26834. In that disclosure, a magnetic core and a coil are provided on both the main unit and display of a portable computer at the rear of the hinge of the portable computer in order to transmit power and data via electromagnetic induction from the main unit to the display in a non-contact state, i.e., without wiring, thereby reducing wire breakage caused by stress at the hinge.

Since a conventional portable information terminal is configured as mentioned earlier, a cellular phone is integral with a camera and the camera is not detachable.

Thus, there existed a problem that it was impossible to attach a camera to a cellular phone only when necessary or detach a camera from a cellular phone integrated with a camera to use the camera for other applications.

SUMMARY OF THE INVENTION

The conventional technology shown in the Unexamined Japanese Patent Application Publication No. Hei 9-26834 is designed to transmit power and data from the main unit of a portable personal computer to the display, not to transmit power and data from the main unit of a cellular phone to a camera in a non-contact state. Thus the conventional technology cannot be applied to a technology whereby a camera as an auxiliary unit is made detachable from the main unit of a cellular phone.

The invention is intended to solve the foregoing problem and aims at providing non-contact signal transmission apparatus in which an auxiliary unit such as a camera can be attached detachably to a main unit such as a cellular phone main unit and that can reliably transmit signals and power via electromagnetic induction through a simple configuration in a non-contact state, when the auxiliary unit is attached to the main unit.

Non-contact signal transmission apparatus according to the invention is characterized in that the apparatus performs signal transmission between a main unit and an auxiliary unit via electromagnetic induction in a non-contact state, wherein a set of power cores having hollow sections are provided as a pair at corresponding positions of a main unit and an auxiliary unit, wherein a wire is wound around each of power cores (power coils) for feeding power from the main unit to the auxiliary unit and at least one set of signal cores are provided as a pair at corresponding positions of the main unit and the auxiliary unit, wherein a wire is wound around each of single cores (single coils) for transmitting signals between the main unit and the auxiliary unit, the at least one set of signal coils arranged in the hollow section of the power core.

Signal coils of non-contact signal transmission apparatus according to the invention is characterized in that the signal coils use signal cores composed of a seating and two columnar cores formed on the seating of the main unit and the auxiliary unit to wind wires so that the directions of the magnetic flux may be opposite between the two columnar cores.

Non-contact signal transmission apparatus according to the invention is characterized in that the apparatus comprises at least two sets of signal coils and arranges the signal coils so that they may be geometrically symmetric at least twice with respect to the center of a power coil and arranges two columnar cores of each signal coil at the same distance from the center of the power coil.

Non-contact signal transmission apparatus according to the invention is characterized in that the apparatus comprises at least two sets of signal coils and arranges the signal coils so that they maybe geometrically symmetric at least twice with respect to the center of a power coil and so that the distance from the center of the power coil to the center of each signal coil may be identical.

Non-contact signal transmission apparatus according to the invention is characterized in that the apparatus comprises two sets of signal coils and arranges the signal coils so that they may come at a right angle from each other and the straight line connecting the centers of coils may pass the center of the power coil.

Non-contact signal transmission apparatus according to the invention is characterized in that in a non-use state the apparatus is configured so that at least a set of signal coils of the main unit and the auxiliary unit may face each other in a dislocated state.

Non-contact signal transmission apparatus according to the invention is characterized in that the apparatus comprises power coils and signal coils integrated via mold resin into a module on the main unit and the auxiliary unit.

Non-contact signal transmission apparatus according to the invention is characterized in that the apparatus comprises an antenna for transmitting/receiving signals to/from outside on the main unit, arranges power coils and signal coils on the top of the main unit and the auxiliary unit, comprises a printed circuit board having wiring patterns to the power coil and the signal coil and an FPC (Flexible Printed Circuit) for transmitting signals to the power coil and the signal coil, and arranges chip capacitors for grounding an antenna signal propagated via the FPC to a ground for feedback at the rear surface of the printed circuit board.

Non-contact signal transmission apparatus according to the invention is characterized in that the apparatus comprises power coils and signal coils and a printed circuit board integrated via mold resin into a module shielded with a metallic coating of a predetermined thickness, excluding the chip capacitors, on the main unit and the auxiliary unit.

Non-contact signal transmission apparatus according to the invention is characterized in that the main unit is a cellular phone and the auxiliary unit is a camera.

DETAILED DESCRIPTION OF THE PREFERRED EMBODIMENTS

Embodiment 1

Figure 1:
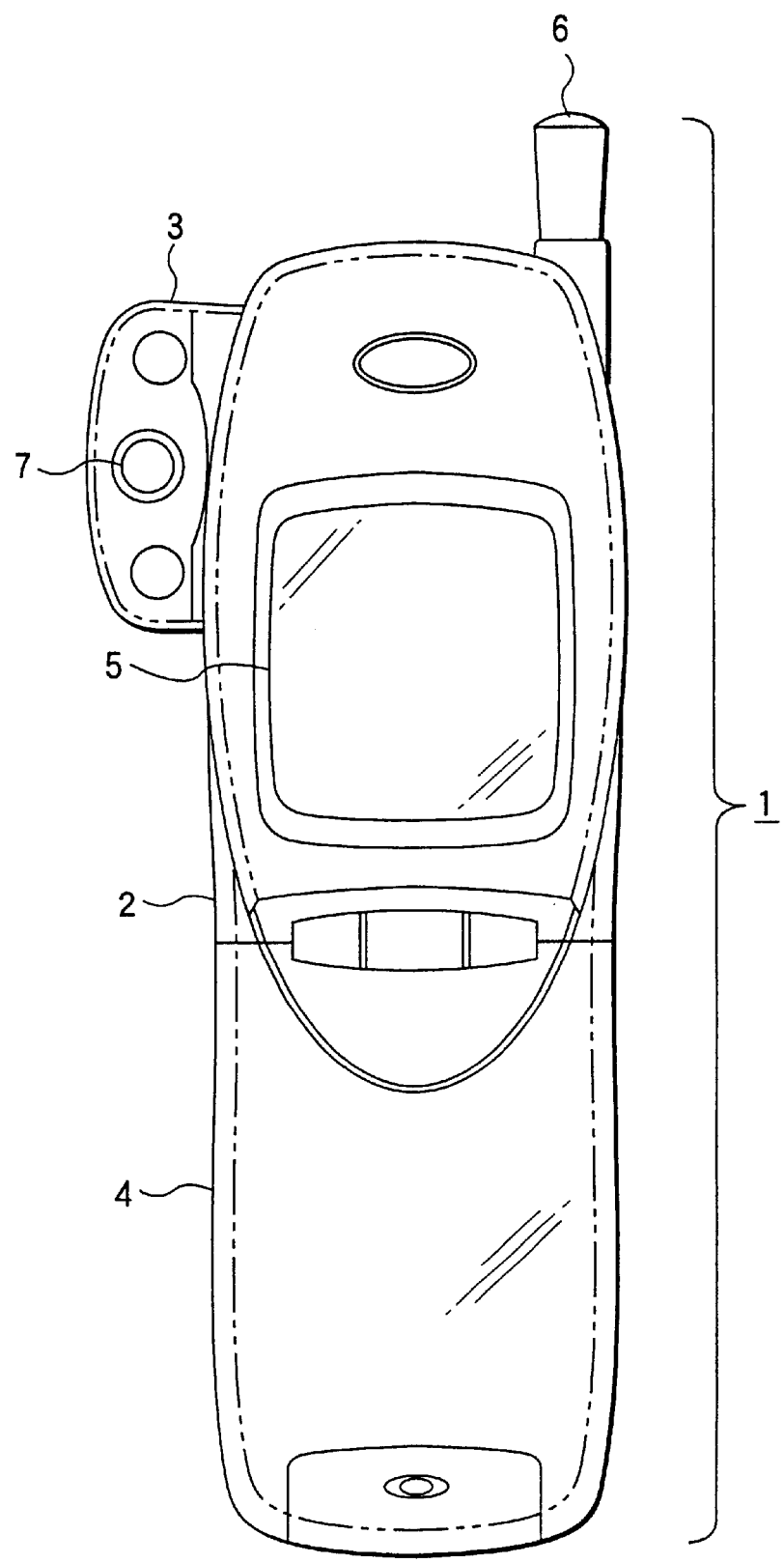
FIG. 1 is a external front view of a portable information terminal using non-contact signal transmission apparatus according to the invention.

FIG. 1 is a front view of a portable information terminal to which non-contact signal transmission apparatus according to the invention is applied, with a camera in use as an auxiliary unit attached to the cellular phone main unit as a main unit.

Figure 2:
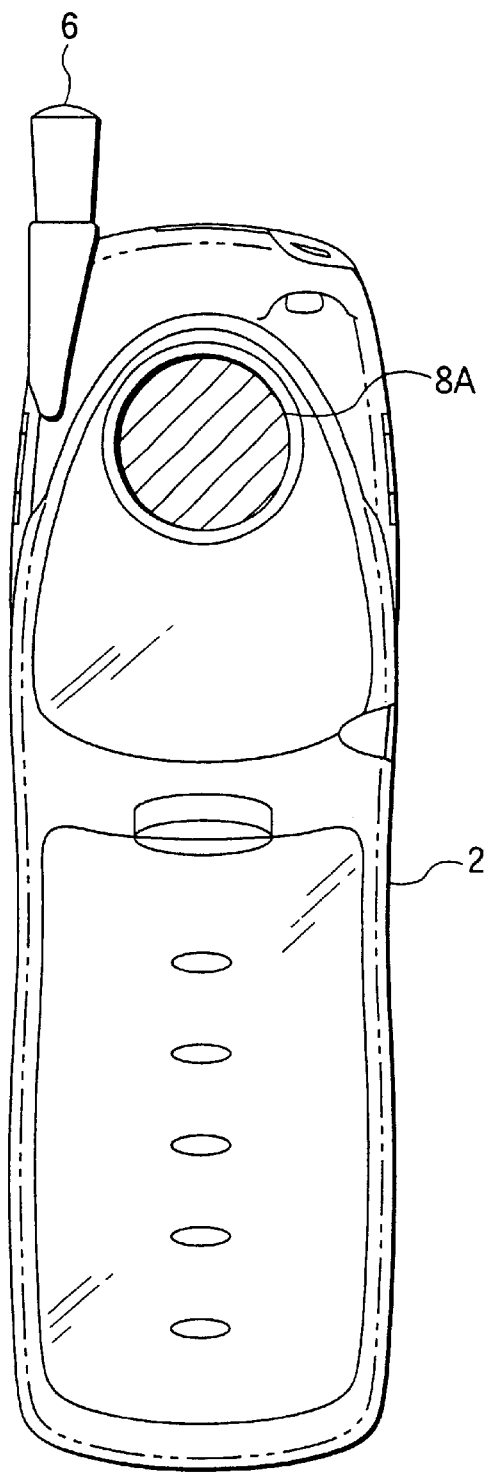
FIG. 2 is a rear view of a portable information terminal with a camera as an auxiliary unit detached.
Figure 3:
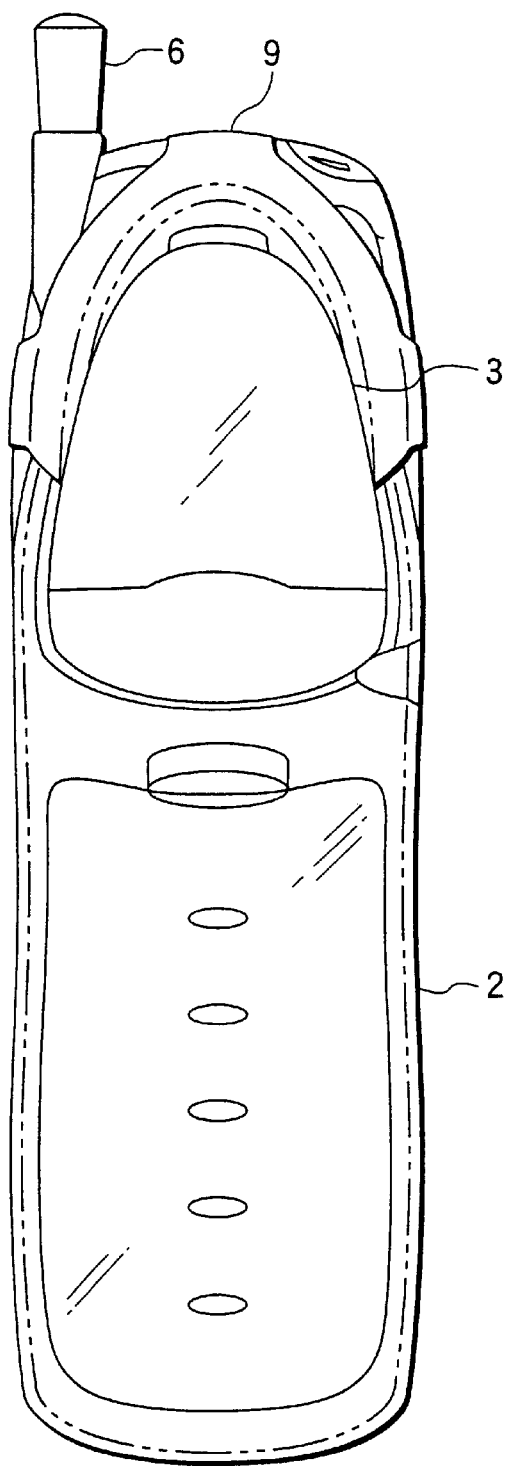
FIG. 3 is a rear view of a portable information terminal with a camera as an auxiliary unit housed in a main unit.
Figure 4:
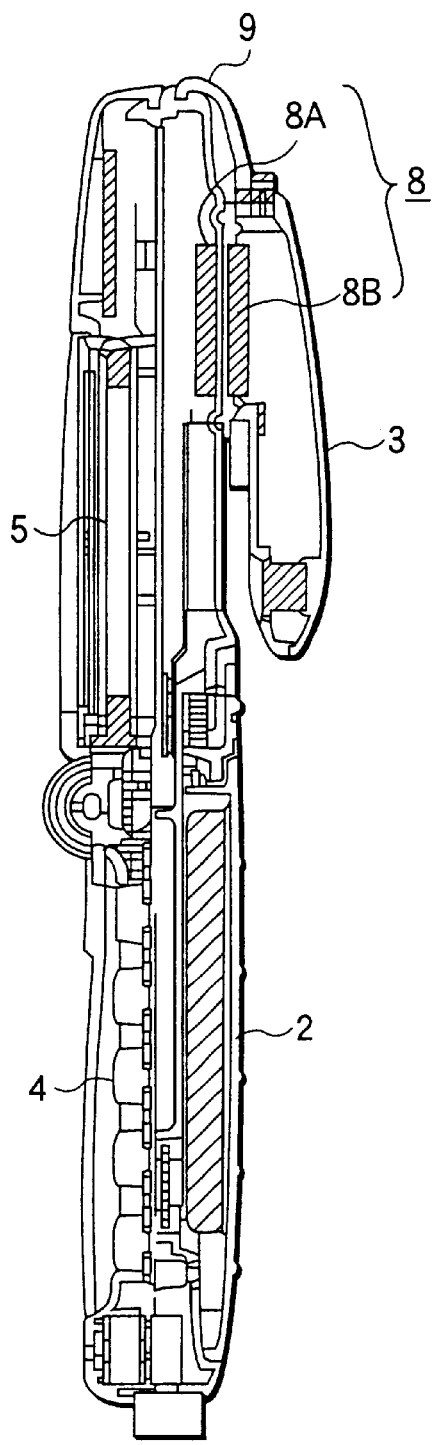
FIG. 4 is a side cross-sectional view of a portable information terminal with a camera as an auxiliary unit housed in a main unit.
Figure 5:
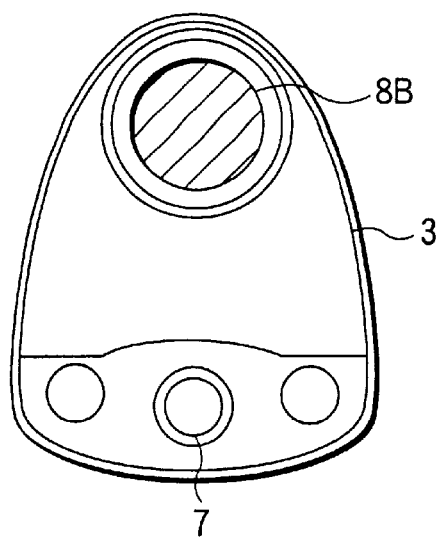
FIG. 5 is a front view of a camera as an auxiliary unit.
Figure 6:
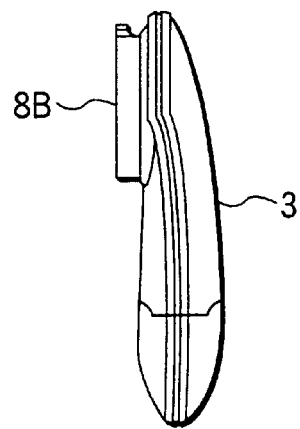
FIG. 6 is a side view of a camera as an auxiliary unit.

FIG. 2 is a rear view of a portable information terminal with a camera detached. FIG. 3 is a rear view of a portable information terminal with a camera attached but in a housed state not in use. FIG. 4 is a side cross-sectional view of a portable information terminal with a camera attached in a housed state. FIG. 5 is a front view of a camera. FIG. 6 is side view of a camera.

In FIG. 1 through FIG. 6, a numeral 1 represents a cellular phone as an example of a portable information terminal, a numeral 2 represents a cellular phone main unit as a main unit of the cellular phone 1, and a numeral 3 represents a camera as an auxiliary unit of the cellular phone 1.

A numeral 4 of the cellular phone main unit 2 represents an operation/input section that retractable via a cover, a numeral 5 represents a display panel for displaying characters and images, a numeral 6 represents an antenna for transmitting/receiving radio waves. A numeral 7 of the camera 3 is a camera lens.

A numeral 8 represents non-contact signal transmission apparatus that transmits power and various signals via electromagnetic induction in a non-contact state without electric wiring between the cellular phone main unit 2 and the camera 3. A numeral 8A represents the cellular phone main unit (main unit) 2 of the non-contact signal transmission apparatus 8. A numeral 8B represents the camera (auxiliary unit) 3 of the non-contact signal transmission apparatus 8. A numeral 9 represents a detaching mechanism for attaching the camera 3 to the cellular phone main unit 2.

Figure 7:
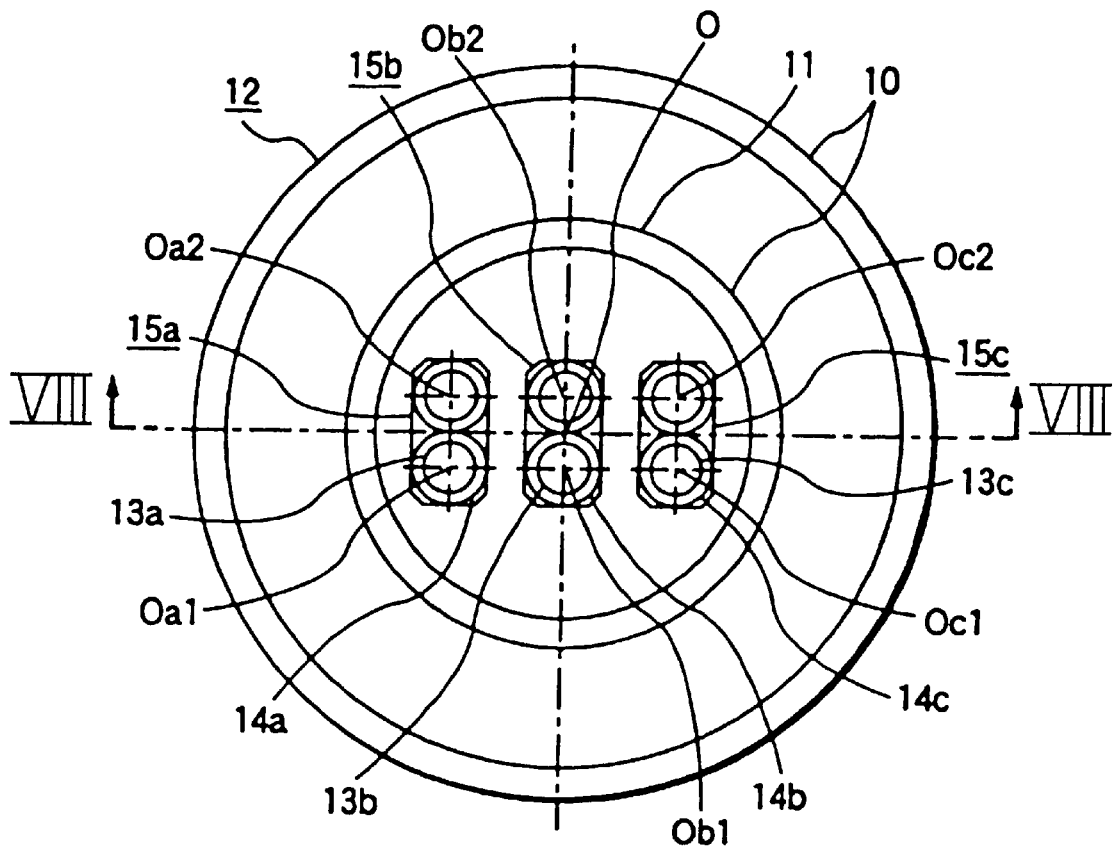
FIG. 7 is a plan view showing the configuration of the main unit of non-contact signal transmission apparatus according to the embodiment 1.
Figure 8:
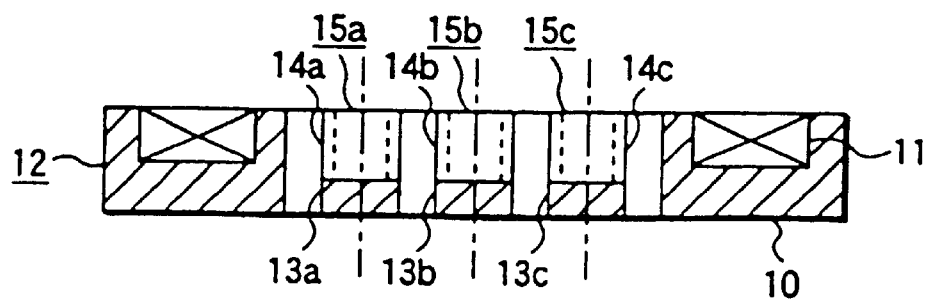
FIG. 8 is a cross-sectional view of FIG. 7 at section along line VIII—VIII.

FIG. 7 is a plan view showing the configuration of the main unit 8A of non-contact signal transmission apparatus 8 according to the embodiment 1. FIG. 8 is a cross-sectional view of FIG. 7 at section along line VIII—VIII and shows details of the main unit 8A of the non-contact signal transmission apparatus 8 shown in FIGS. 2 and 4.

In FIGS. 7 and 8, a numeral 10 represents a pot-type power core having a hollow center, a numeral 11 represents a wire wound around the power core 10, and a numeral 12 represents a power coil composed of a power core 10 and the wire 11.

Numerals 13a, 13b and 13c represent signal cores arranged in parallel with each other so that they may be geometrically symmetric twice with respect to the center O of the power core 10.

Here, "to arrange so that they may be geometrically symmetric twice" refers to an arrangement so that the initial state may appear twice while the signal cores are turned 360 degrees around the center O of the power core 10.

Figure 9:
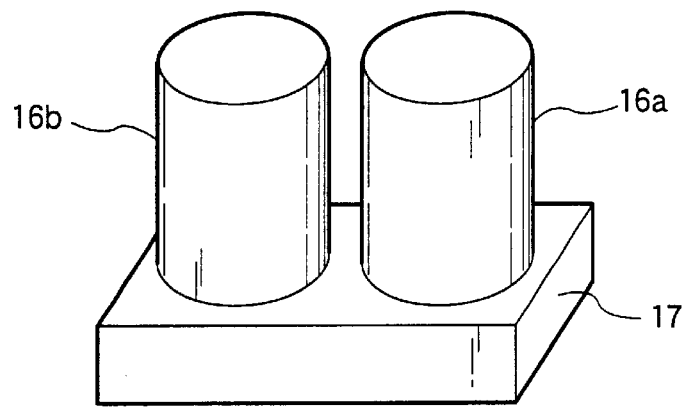
FIG. 9 is a perspective view showing a shape of signal cores on non-contact signal transmission apparatus according to the embodiment 1.

FIG. 9 is a perspective view of the signal cores 13a, 13b or 13c.

In FIG. 9, numerals 16a and 16b represent columnar cores formed in cylinder shape and split into two in order to wind a wire in figure eight. A numeral 17 represent a seating on which cores 16a, 16b are placed and which combines cores 16a, 16b at the bottom.

The cores 16a, 16b and the seating 17 are made of a magnetic substance such as the ferrite and form electromagnetically coupled concave cores.

While the cores 16a, 16b and the seating 17 are assumed as separate, they may be an integrally-molded.

Figure 10:
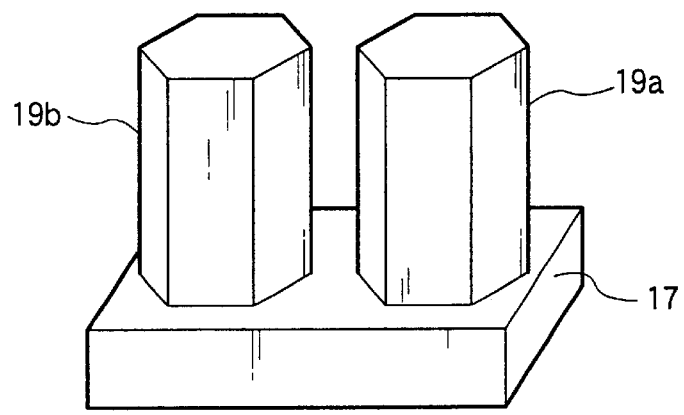
FIG. 10 is a perspective view showing another shape of signal cores on non-contact signal transmission apparatus according to the embodiment 1.
Figure 11:
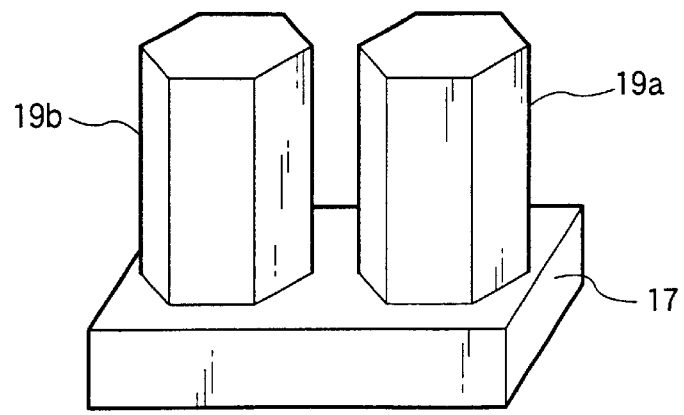
FIG. 11 is a perspective view showing another shape of signal cores of non-contact signal transmission apparatus according to the embodiment 1.

FIGS. 10 and 11 show variations of the signal cores 13a, 13b or 13c in FIG. 9.

In FIG. 10, numerals 18a and 18b represent columnar cores in the shape of a quadrangular column. In FIG. 11, numerals 19a and 19b represent columnar cores in the shape of a hexagonal column. These cores are both coupled at the bottom and have the same feature as the signal cores shown in FIG. 9.

In FIGS. 7 and 8, numerals 14a, 14b and 14c represent wires wound in figure eight around the tips split into two (for example two columnar cores 16a and 16b in FIG. 9) of the signal cores 13a, 13b and 13c respectively so that the directions of the magnetic flux may be opposite. A numeral 15a represents a signal coil formed of the signal core 13a and the wire 14a. A numeral 15b represents a signal coil formed of the signal core 13b and the wire 14b. A numeral 15c represents a signal coil formed of the signal core 13c and the wire 14c.

As mentioned earlier, the signal cores 13a, 13b and 13c are arranged so that they may be geometrically symmetric twice with respect to the center O of the power core 10 in the hollow section of the power core 10. Thus, the signal cores 15a, 15b and 15c are also arranged so that they may be geometrically symmetric twice with respect to the center O of the power core 10 (also the center of the power coil 12).

The signal cores 15a, 15b and 15c are arranged so that two split cores may be at a same distance from the center of the power core 10.

As shown in FIG. 7, assuming the center of the power coil 12 as O, the centers of two split cores of the signal core 13a as Oa1 and Oa2 respectively, the centers of two split cores of the signal core 14a as Ob1 and Ob2 respectively, and the centers of two split cores of the signal core 15a as Oc1 and Oc2 respectively, the cores are arranged so that the distance between O and Oa1 may be equal to the distance between O and Oa2, that the distance between O and Ob1 may be equal to the distance between O and Ob2, and that the distance between O and Oc1 may be equal to the distance between O and Oc2, respectively.

Figure 12:
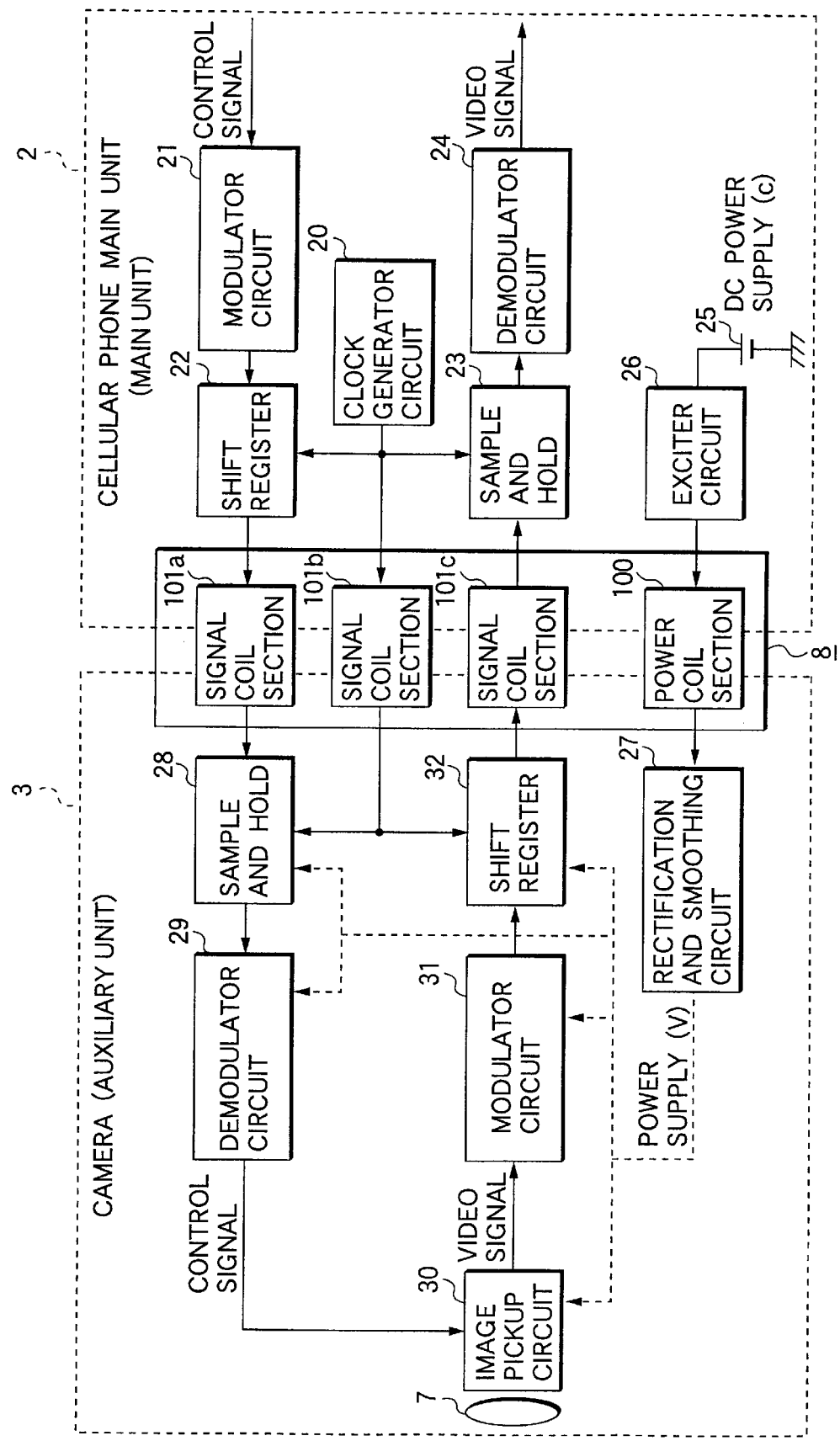
FIG. 12 is a block diagram showing the entire circuit configuration of a portable information terminal that uses non-contact signal transmission apparatus according to the embodiment 1.

FIG. 12 is a block diagram showing the entire circuit configuration of a portable information terminal that uses non-contact signal transmission apparatus according to the embodiment 1 of the invention.

In FIG. 12, a numeral 2 represents a cellular phone main unit (main unit), 3 a camera (auxiliary unit), 8 non-contact signal transmission apparatus arranged on both the main unit 8A and the auxiliary unit 8B, for performing transmission/reception of signals including power between them in a non-contact state without connecting signal lines.

As shown in FIG. 12, the non-contact signal transmission apparatus 8 is composed of a power coil section 100 for feeding power from the cellular phone main unit 2 as a main unit to the camera 3 as an auxiliary unit, and at least one signal coil (10a, 101b, 101c) for transmitting signals between the cellular phone main unit 2 and the camera 3.

As mentioned later, the power coil section 100 is composed of a power coil 12 of the main unit and the paired power coil 40 of the auxiliary unit facing the power coil 12. The signal coil section 101a is composed of a signal coil 15a of the main unit and the paired signal coil 41a of the auxiliary unit facing the signal coil 15a. The signal coil section 101b is composed of a signal coil 15b of the main unit and the paired signal coil 41b of the auxiliary unit facing the signal coil 15b. The signal coil section 101c is composed of a signal coil 15b of the main unit and the paired signal coil 41c of the auxiliary unit facing the signal coil 15c.

In the cellular phone main unit (main unit) 2, a numeral 20 represents a clock generator circuit, 21 a modulator circuit for modulating a control signal, 22 a shift register for outputting a control signal to a signal coil such as the signal 10 coil 15a in FIGS. 7 and 8 of the main unit 8A of the signal coil section 101a.

A numeral 23 represents a sample and hold for outputting a video signal in synchronization with a clock signal, 24 a demodulator circuit for demodulating the a video signal.

A numeral 25 represents a DC power supply such as a battery, 26 an exciter circuit for converting the DC power to AC power and outputting the AC power to the power coil (the power coil 12 in FIGS. 7 and 8) of the main unit 8A of the power coil section 100.

In the camera (auxiliary unit) 3, a numeral 27 represents a rectification and smoothing circuit for rectifying AC power output from the power coil of the auxiliary unit 8B of the power coil section 100 as well as for smoothing the AC power and feeding the resulting power as DC power to the circuits of the camera 3. A numeral 28 represents a sample and hold for outputting a control signal from the signal coil section 101a in synchronization with a clock signal. A numeral 29 represents a demodulator circuit for demodulating the control signal.

A numeral 30 represents an image pickup circuit for converting the image of an object via a camera lens 7 to a video signal, 31 a modulator circuit for modulating a control signal, 32 a shift register for outputting a video signal in synchronization with a clock signal to the signal coil section 101c as a coil section for a video signal.

Figure 13:
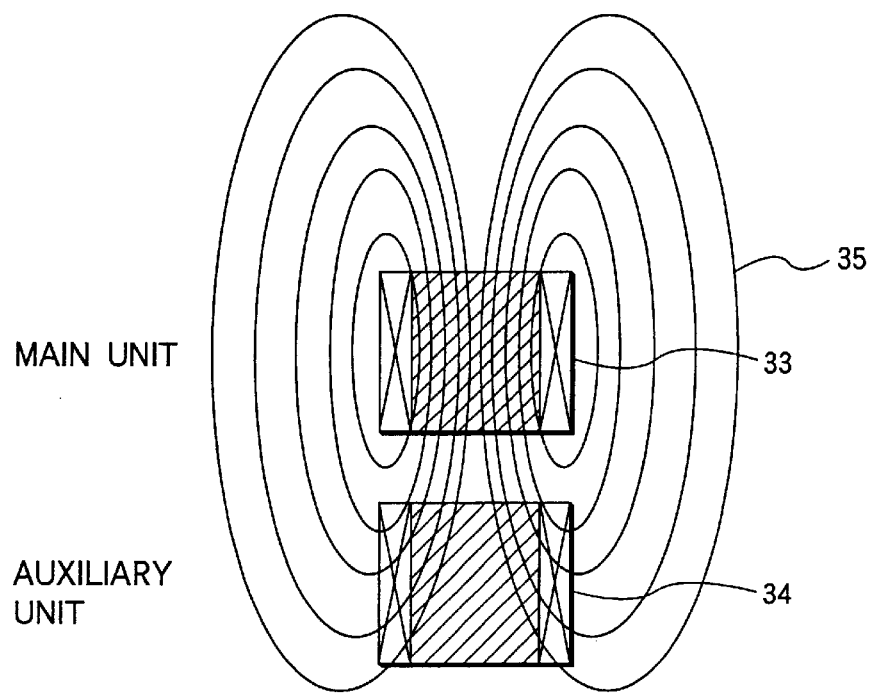
FIG. 13 is a schematic diagram showing the principle of operation of non-contact signal transmission apparatus according to the embodiment 1.

FIG. 13 is a schematic diagram showing the principle of transmitting power or signals using electromagnetic induction between coils.

In FIG. 13, a numeral 33 represents a first coil arranged in the main unit 8A, 34 a second coil arranged on the auxiliary unit 8B facing the first coil 33, and 35 a line of magnetic flux showing the flow of a flux generated from the first coil 33.

Figure 14:
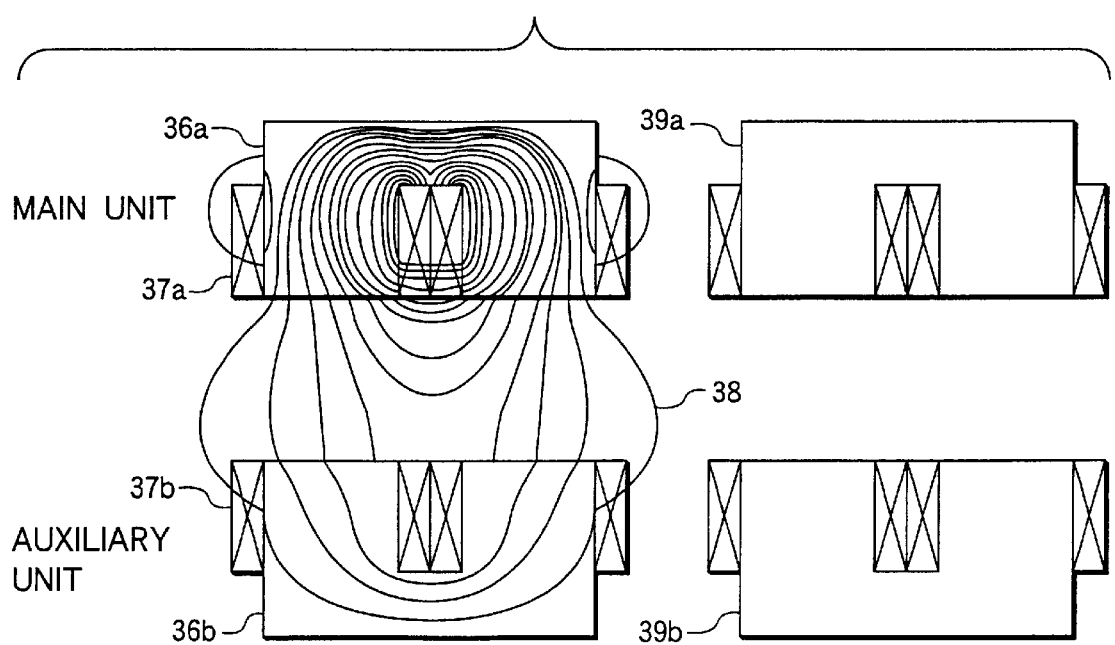
FIG. 14 is a diagram showing the results of magnetic field analysis on the signal coils of non-contact signal transmission apparatus according to the embodiment 1.

FIG. 14 shows the results of magnetic field analysis on the signal coils wound in figure of eight.

In the figure, a numeral 36a represents a signal core of the main unit 8A, 36b a signal core arranged in the auxiliary unit 8B facing the signal core 36a, 37a and 37b wires wound around the signal cores 36a and 36b respectively, 38 a line of magnetic flux showing the flow of a flux generated from the signal core 36a, 39a a signal core arranged next to the signal core 36a of the main unit 8A that is generating a magnetic flux, and 39b a signal core arranged on the auxiliary unit 8B facing the signal core 39a.

Next, the operation of the non-contact signal transmission apparatus will be described.

As shown in FIG. 2, the portable information terminal using non-contact signal transmission apparatus 8 according to the embodiment 1 can be used as a cellular phone 1 equipped with an antenna 6 even when cellular phone main unit (main unit) 2 alone is used.

Power and control signals can be fed to the camera (auxiliary unit) 3 and the camera 3, by using a unit that can receive video signals, can be used as another apparatus.

When wishing to add a feature for transmitting a video signal picked up by the camera 3, the user can attach the camera 3 to the cellular phone main unit 2 via the detaching mechanism 9, as shown in FIGS. 3 and 4.

Further, as shown in FIG. 1, images picked up by the camera lens 7 with the camera 3 turned so that camera lens 7 is exposed can be monitored by displaying the images on a display panel 5. The images can also be displayed on the display panel 5 of the cellular phone 1 of the distant party by transmitting the corresponding video signal via radio waves from the antenna 6 to the cellular phone 1 of the distant party.

Next, referring to FIG. 12 that shows the entire circuit configuration, the operation of the non-contact signal transmission apparatus will be described.

In the cellular phone main unit (main unit) 2, the clock generator circuit 20 generates a clock signal necessary for synchronizing the entire circuit of the cellular phone main unit 2. The clock signal is transmitted to the camera (auxiliary unit) 3 via the signal coil section 101b. The modulator circuit 21 modulates a control signal generated via operation/input of the operation/input section 4. The shift register 22 outputs the control signal to the signal coil section 101a in synchronization with the clock signal.

The exciter circuit 26 converts the DC power from the DC power supply 25 to AC power and outputs the AC power to the power coil section 100.

In the camera (auxiliary unit) 3, the rectification and smoothing circuit 27 rectifies AC power output from the power coil section 100 as well as for smoothes the AC power and feeds the resulting power as DC power to the circuits of the camera 3.

The sample and hold 28 outputs the control signal output from the signal coil section 101a in synchronization with the clock signal.

The demodulator circuit 29 demodulates the control signal and outputs the resulting signal to the image pickup circuit 30.

The image pickup circuit 30 converts the image of an object via a camera lens 7 to a video signal. The modulator circuit 31 modulates the control signal converted by the image pickup circuit 30.

The shift register 32 outputs the video signal modulated by the modulator circuit 31 in synchronization with the clock signal to the video signal coil 15c.

In the cellular phone main unit (main unit) 2, the sample and hold 23 outputs the video signal output from the signal coil section 101c as a coil section for a video signal in synchronization with the cock signal to the demodulator circuit 24. The demodulator circuit 24 demodulates the video signal to display the video signal on the display panel 5 or transmits the video signal from the antenna 6 to the cellular phone 1 of the distant party.

Demodulator circuits 21, 31 convert a control signal and a video signal in the digital waveform to, for example, a waveform conforming to the Return to Zero system. Thus, it is possible to transmit these signals without failure by using the non-contact signal transmission apparatus 8 that use electromagnetic induction.

The Return to Zero system refers to a signal conversion system where by a digital "1" is converted to "1, 0" and a digital "0" is converted to "−1, 0".

FIG. 13 shows the operation principle of non-contact signal transmission apparatus according to the invention. Referring to FIG. 13, non-contact power or signal transmission via electromagnetic induction will be described.

In the figure, a numeral 33 represents a first coil on the main unit 8A, 34 a second coil on the auxiliary unit 8B, and 35 a line of flux. Inputting power or various signals to the first coil 33 on the main unit 8A generates the corresponding flux on the first coil 33 and another flux on the second coil 34, both fluxes interlinking with each other. This causes an output signal corresponding to the input signal to be obtained on the second coil 34 on the auxiliary unit 8B. Similarly, inputting various signals to the second coil 34 on the auxiliary unit 8B generates an output corresponding to the input signal on the first coil 33 on the main unit 8A facing the coil 34 via electromagnetic induction, thereby transmitting the signal in a non-contact state.

Next, referring to FIG. 14, the results of magnetic field analysis on the signal coil wound in figure of eight will be described.

The flux generated by inputting a signal to the wire 37a wound around the signal core 36a forms a loop with the signal core 36b on the auxiliary unit 8B facing the signal core 36a as shown by the line of flux 38. Thus, the flux does not excite another signal core 39a arranged next to the signal core 36a and the signal core 39b on the auxiliary unit 8B facing the signal core 39a.

Thus, winding a wire in the figure of eight around a U-shaped core (two columnar cores formed on a seating as shown in FIG. 9 through FIG. 11) reduces leak flux thereby reducing a crosstalk for another adjacent signal coil.

Figure 15:
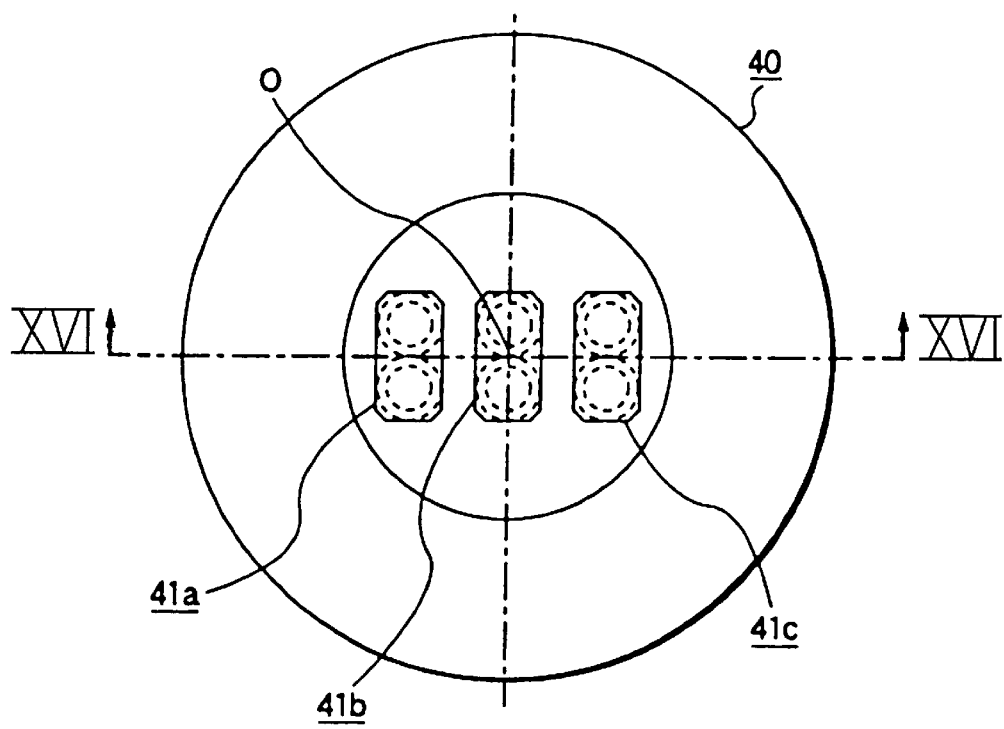
FIG. 15 is a plan view showing the positions of the coils of non-contact signal transmission apparatus according to the embodiment 1 with the camera (auxiliary unit) in a use state.
Figure 16:
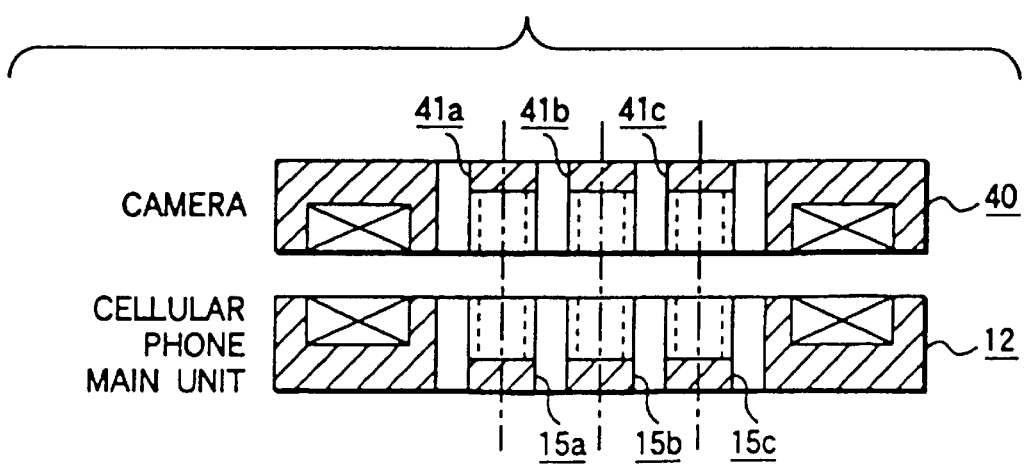
FIG. 16 is a cross-sectional view of FIG. 15 at section along line XVI—XVI.

FIG. 15 is a plan view showing the positions of the coils of non-contact signal transmission apparatus 8 according to the embodiment 1 with the camera (auxiliary unit) 3 in a use state. FIG. 16 is a cross-sectional view of FIG. 15 at section along line XVI—XVI.

As shown in FIG. 16, the non-contact signal transmission apparatus 8A on the cellular phone main unit (main unit) 2 is composed of a power coil 12 and for example three signal coils 15a, 15b, 15c. The non-contact signal transmission apparatus 8B on the camera (auxiliary unit) 3 are composed of a power coil 40 and three signal coils 41a, 41b, 41c, respectively corresponding to the power coil 12 and the three signal coils 15a, 15b, 15c on the cellular phone main unit 2.

Power coils 12 and 40, signal coils 15a and 41a, signal coils 15b and 41b, and signal coils 15c and 41c respectively have the same shape and dimensions. On the camera (auxiliary unit) 3 and the cellular phone main unit 2, power coils and signal coils are paired and arranged respectively facing each other under the same position conditions.

That is, by adjusting the position of an auxiliary unit relative to the main unit when the auxiliary unit is in use, the power coil pair and signal coil pairs can be aligned completely facing each other.

When wishing to use a camera, the user turns the camera 3 from the cellular phone main unit 2 to a position where the camera lens 7 is exposed.

In this practice, the power coil on the cellular phone main unit 2 and the power coil 40 on the camera 3, and the three signal coils 15a, 15b, 15c on the cellular phone main unit 2 and the three signal coils 41a, 41b, 41c are aligned facing each other thus allowing transmission/reception of power and signals.

As shown in FIGS. 3 and 4, in case the camera 3 is housed, the camera 3 is turned by 90 degrees and let the camera lens 6 hidden in the cellular phone main unit 2.

This protects the camera lens 7 and eliminates a protrusion thus making the non-contact signal transmission apparatus easier to transport.

Figure 17:
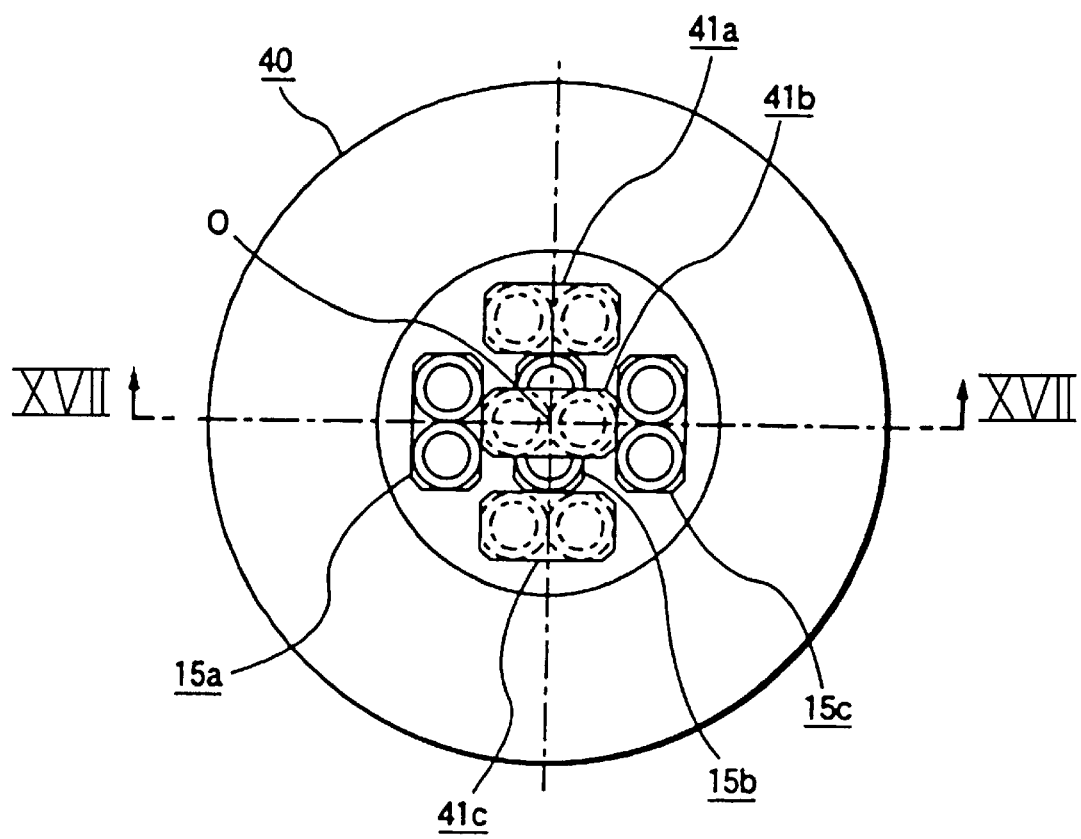
FIG. 17 is a plan view showing the positions of the coils of non-contact signal transmission apparatus according to the embodiment 1 with the camera (auxiliary unit) in a housed state.
Figure 18:
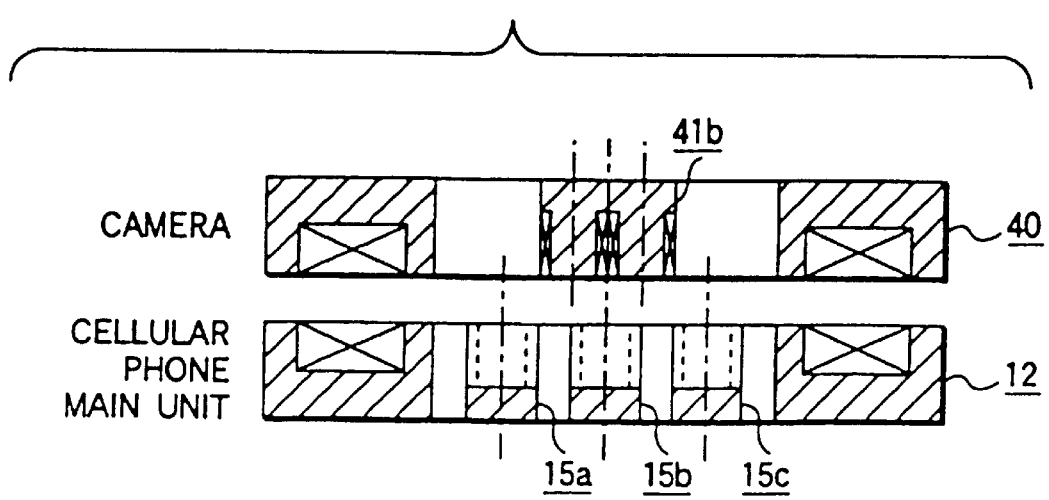
FIG. 18 is a cross-sectional view of FIG. 15 at section along line XVIII—XIII.

FIG. 17 is a plan view of showing the positions of the coils of non-contact signal transmission apparatus 8 on the cellular phone main unit (main unit) 8A and the camera (auxiliary unit) 8B facing each other in a state where the camera 3 is housed in the cellular phone main unit 2. FIG. 18 is a cross-sectional view of FIG. 17 at section along line XVIII—XVIII.

FIG. 17 shows the state where the power coil 40 and the signal coils 41a, 41b, 41c are turned clockwise by 90 degrees about the center of the power coil 40 from the position shown in FIG. 15.

In this housed state, only the power coils 12 and 40 on the cellular phone main unit 2 and the camera 3 are completely aligned and the signal coils 15a and 15c on the cellular phone main unit 2 do not face the signal coils 41a and 41c of the camera 3. The signal coils 15b and 41b face each other displaced by 90 degrees, not aligned at all.

In this way, non-contact signal transmission apparatus according to the embodiment 1 of the invention, the main unit comes in contact with the auxiliary unit without wiring. This allows the auxiliary unit to be attached detachably to the main unit. Plural (for example three) signal coils are arranged in the hollow section of the power coil on each of the main unit 8A and the auxiliary unit 8B. This enlarges the surface area of each power coil thus providing stable power. Plural coils are arranged in parallel. This enlarges the interval between signal coils thus reducing crosstalk between adjacent signal coils.

Moreover, signal coils where wires are wound in the figure of eight on the main unit 8A and the auxiliary unit 8B to generate fluxes in opposite directions are arranged so that the two columnar cores are at the same distance from the center of the power coil. This cancels the interlinkage fluxes from the power coils between the right and left wires of the 8-shaped coil thus eliminating the influence of crosstalk from the power coil.

When the camera 3 is housed, two sets of signal coils at both ends, the signal coils 15a and 41a and the signal coils 15c and 41c do not face each other respectively and signal coils 15b and 41b face each other at a right angle, thus canceling the flux and causing the signal transmission to be interrupted. This allows the user to know that the camera 3 is in a housed state without a special position detector. It is also possible to suspend power feeding from the cellular phone main unit 2 to the camera 3 or to automatically switch the cellular phone 1 to the camera non-use mode.

Figure 19:
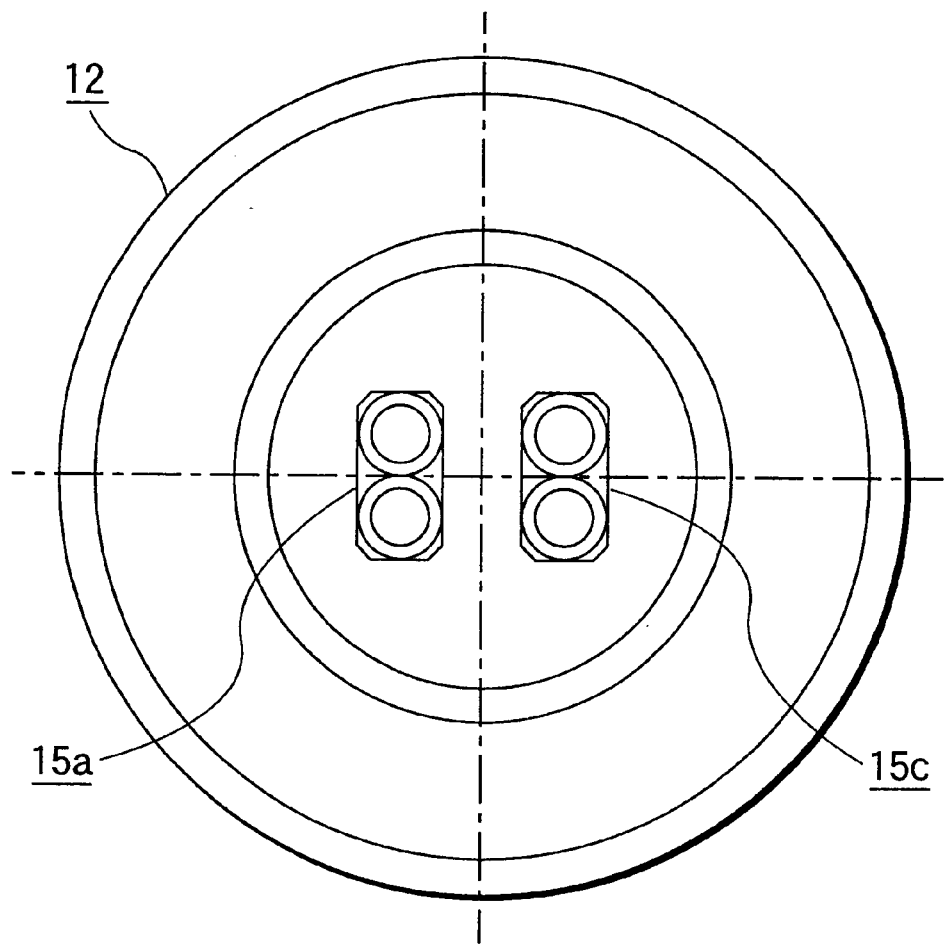
FIG. 19 is a plan view showing another embodiment of non-contact signal transmission apparatus according to the embodiment 1.

The embodiment 1 assumes a case where three signal coils are arranged in parallel in the hollow section of a power coil. The same advantages can be obtained by mounting a clock signal regenerator circuit on the camera 3 and skipping clock signal transmission from the main unit 8A and as shown in FIG. 19, by configuring the main unit 8A with two signal coils, a signal coil 15a for a control signal and a signal coil 15c for a video signal and arranging these coils in parallel so that they may be symmetric twice.

While the auxiliary unit 8B is not shown, the power coil and two signal coils on the auxiliary unit 8B are configured the same as the main unit 8A.

While the embodiment 1 assumes a case where three signal coils are used and a use state and housed state are turned by 90 degrees, it is clear that the turning angle and coil interval depend on the camera attaching position and structure.

Embodiment 2

Figure 20:
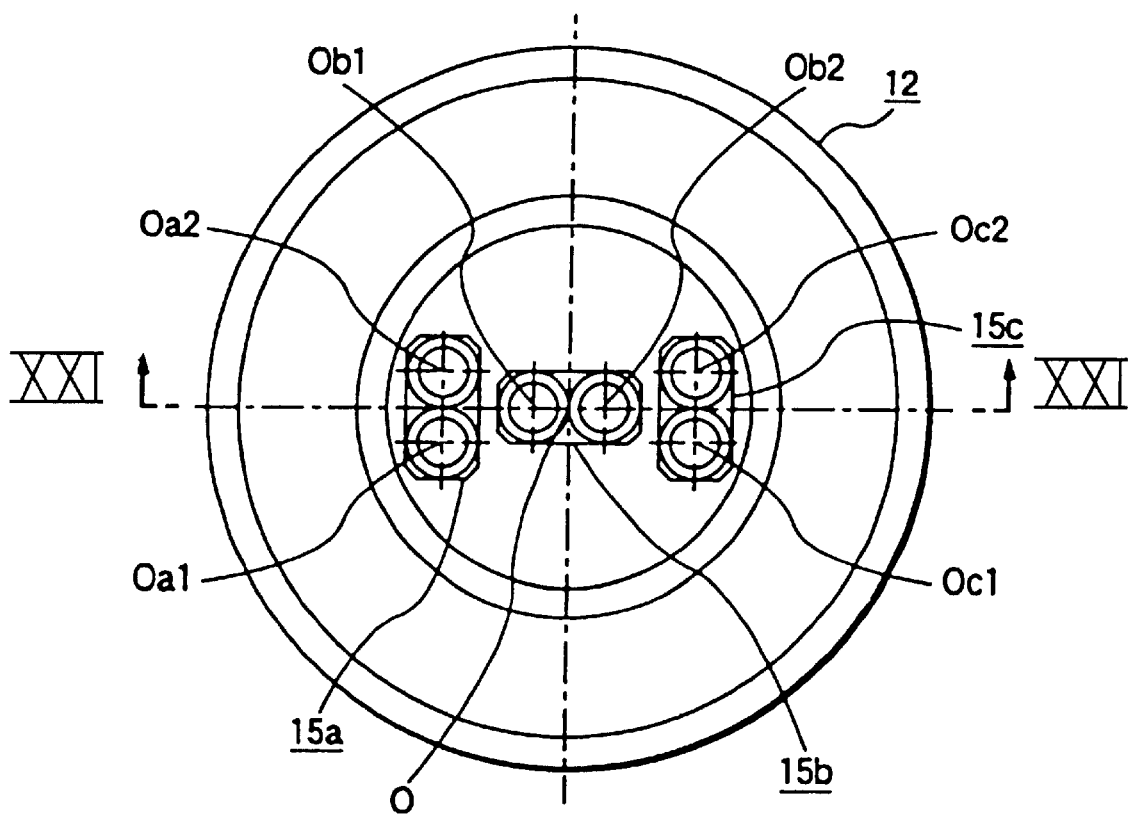
FIG. 20 is a plan view showing the configuration of the main unit of non-contact signal transmission apparatus according to the embodiment 2.
Figure 21:
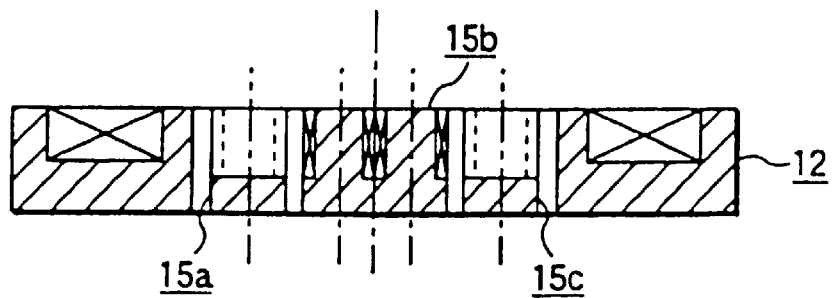
FIG. 21 is a cross-sectional view of FIG. 20 at section along line XXI—XXI.

FIG. 20 is a plan view showing the configuration of the main unit 8A of non-contact signal transmission apparatus 8 according to the embodiment 2. FIG. 21 is a cross-sectional view of FIG. 20 at section along line XXI—XXI.

In the figure, a numeral 12 represents a power coil, 15a, 15b, 15c a signal coil for a control signal, a clock signal, and a video signal respectively. The signal coils are arranged in the shape of H in the hollow section of the power coil 12 so that they may be symmetric twice and arranged so that the two split cores may be at the same distance from the center of the power coil 12.

Assuming the center of the power coil 12 as O, the centers of two split cores of the signal core 15a as Oa1 and Oa2 respectively, the centers of two split cores of the signal core 15b as Ob1 and Ob2 respectively, and the centers of two split cores of the signal core 15c as Oc1 and Oc2 respectively, the cores are arranged so that the distance between O and Oa1 may be equal to the distance between O and Oa2, that the distance between O and Ob1 may be equal to the distance between O and Ob2, and that the distance between O and Oc1 may be equal to the distance between O and Oc2, respectively.

Next, the operation of the non-contact signal transmission apparatus will be described.

Figure 22:
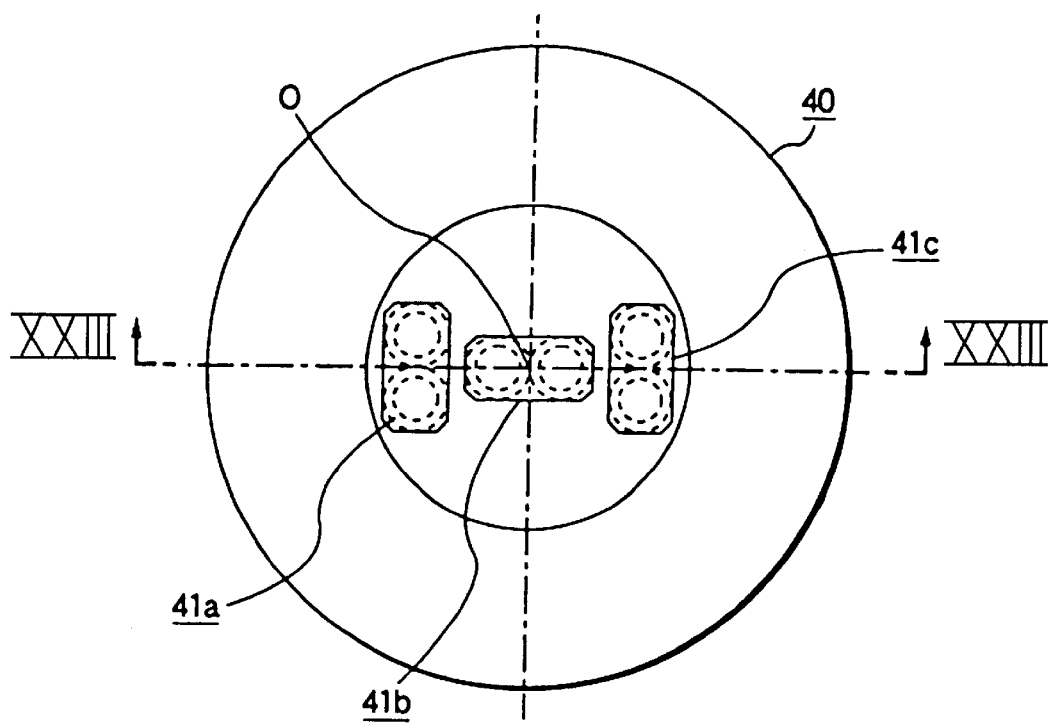
FIG. 22 is a plan view showing the positions of the coils of non-contact signal transmission apparatus according to the embodiment 2 with the camera (auxiliary unit) in a use state.
Figure 23:
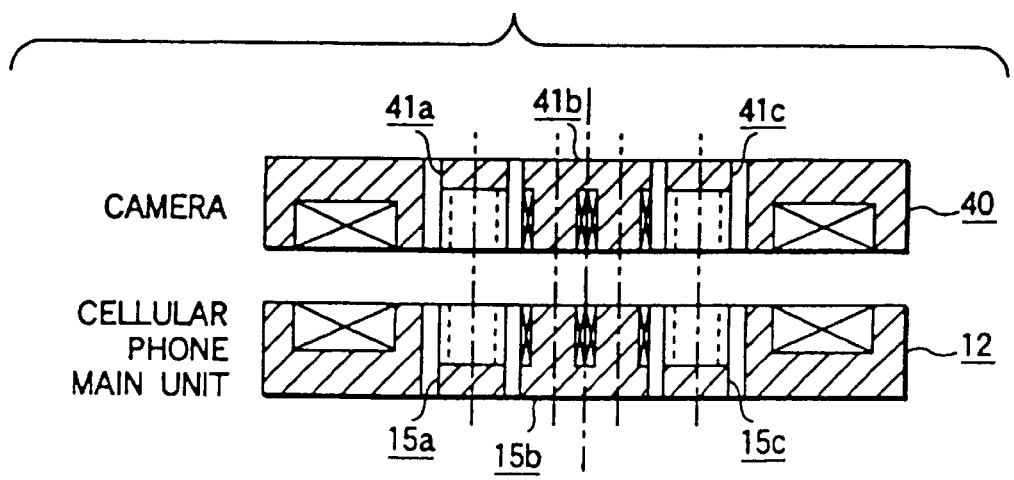
FIG. 23 is a cross-sectional view of FIG. 22 at section along line XXIII—XXIII.

FIG. 22 is a plan view showing positions of the coils of non-contact signal transmission apparatus 8 with the camera 3 in a use state in non-contact signal transmission apparatus 8. FIG. 23 is a cross-sectional view of FIG. 22 at section along line XXIII—XXIII.

In this practice, the power coil 12 on the cellular phone main unit 2 and the power coil 40 on the camera 3, and the three sets of signal coils 15a and 41a, 15b and 41b, and 15c and 41c are paired and aligned facing each other thus allowing transmission/reception of power and signals via electromagnetic induction in the non-contact state.

In this embodiment, same as the embodiment 1, power coils 12 and 40, signal coils 15a and 41a, signal coils 15b and 41b, and signal coils 15c and 41c respectively have the same shape and dimensions. On the camera (auxiliary unit) 3 and the cellular phone main unit 2, power coils and signal coils are paired and arranged respectively facing each other under the same position conditions.

Figure 24:
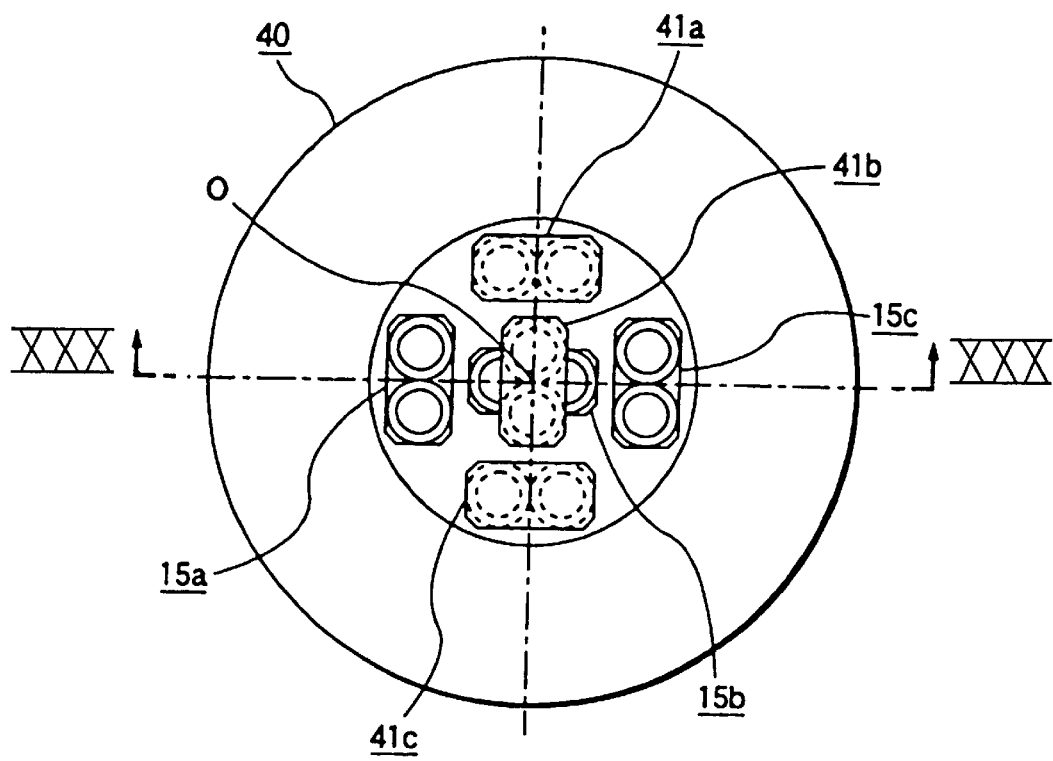
FIG. 24 is a plan view showing the positions of the coils of non-contact signal transmission apparatus according to the embodiment 2 with the camera (auxiliary unit) in a housed state (non-use state).
Figure 25:
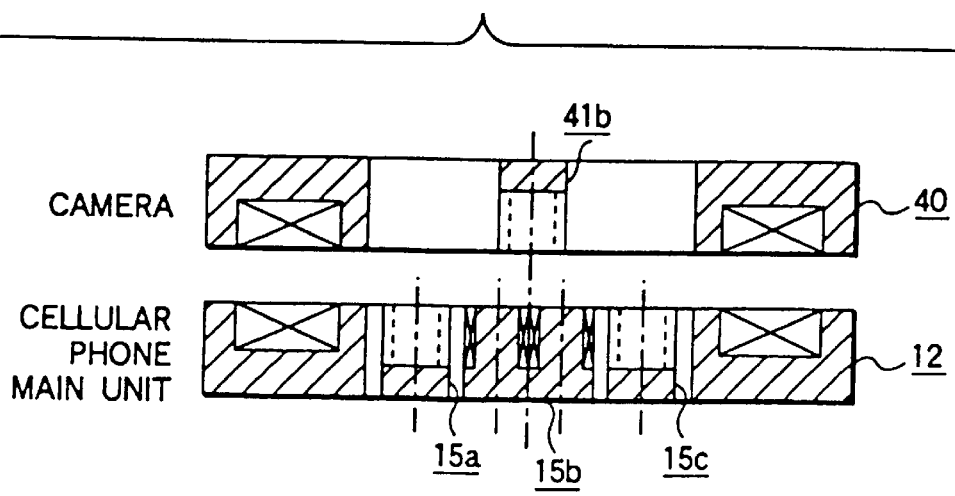
FIG. 25 is a cross-sectional view of FIG. 24 at section along line XXV—XXV.

FIG. 24 is a plan view of showing the positions of the coils with the camera 3 housed in the cellular phone main unit 2 (that is, in a non-use state). FIG. 25 is a cross-sectional view of FIG. 24 at section along line XXV—XXV.

FIG. 24 shows the state where the power coil 40 and the signal coils 41a, 41b, 41c are turned clockwise by 90 degrees about the center O of the power coil 40 from the position shown in FIG. 22.

In this state, only the power coils 12 and 40 on the cellular phone main unit 2 and the camera 3 are completely aligned and the signal coils 15a and 15c on the cellular phone main unit 2 do not face the signal coils 41a and 41c of the camera 3. The signal coils 15b and 41b face each other displaced by 90 degrees, not aligned at all.

In this way, non-contact signal transmission apparatus according to the embodiment 2 of the invention, signal coils 15a, 15b, 15c where wires are wound in the figure of eight on the main unit 8A to generate fluxes in opposite directions are arranged in the hollow section of the power coil 12. This enlarges the surface area of the power coil 12 thus providing stable power.

Similarly, on the auxiliary unit 8B, signal coils 41a, 41b, 41c where wires are wound in the figure of eight on the auxiliary unit 8B to generate fluxes in opposite directions are arranged in the hollow section of the power coil 40. This enlarges the surface area of the power coil 40 thus providing stable power.

Moreover, on each of the main unit 8A and the auxiliary unit 8B, signal coils 15a, 15b, 15c or signal coils 41a, 41b, 41c where wires are wound in the figure of eight to generate fluxes in opposite directions are arranged in the shape of H and the two split cores are arranged at the same distance from the center O of the power coil 12 or 40. This cancels the interlinkage fluxes from the power coil 12 or 40 between the right and left wires of the 8-shaped coil thus eliminating the influence of crosstalk from the power coil 12 or 40.

For the 8-shaped signal coil, fluxes pass in the opposite directions between two cores and the fluxes cancels each other in the right angle thus eliminating crosstalk.

Thus, crosstalk is reduced to zero between the signal coils 15a and 15b the signal coils 15b and 15c adjacent at a right angle on the main unit 8A, or between the signal coils 41a and 41b the signal coils 41b and 41c adjacent at a right angle on the auxiliary unit 8B. As a result, crosstalk is reduced between the signal coils 15a, 15b and 15c.

When the camera (auxiliary unit) 3 is housed, signal coils on the cellular phone main unit 2 and the camera (auxiliary unit) 3, that is, a pair 15a and 41a and a pair 15c and 41c do not face each other respectively and signal coils 15b and 41b face each other at a right angle, thus canceling the flux and causing the signal transmission to be interrupted. This allows the user to know that the camera (auxiliary unit) 3 is in a housed state without a special position detector. It is also possible to suspend power feeding from the cellular phone main unit 2 to the camera (auxiliary unit) 3 or to automatically switch the cellular phone (portable information terminal) 1 to the camera non-use mode.

Embodiment 3

Figure 26:
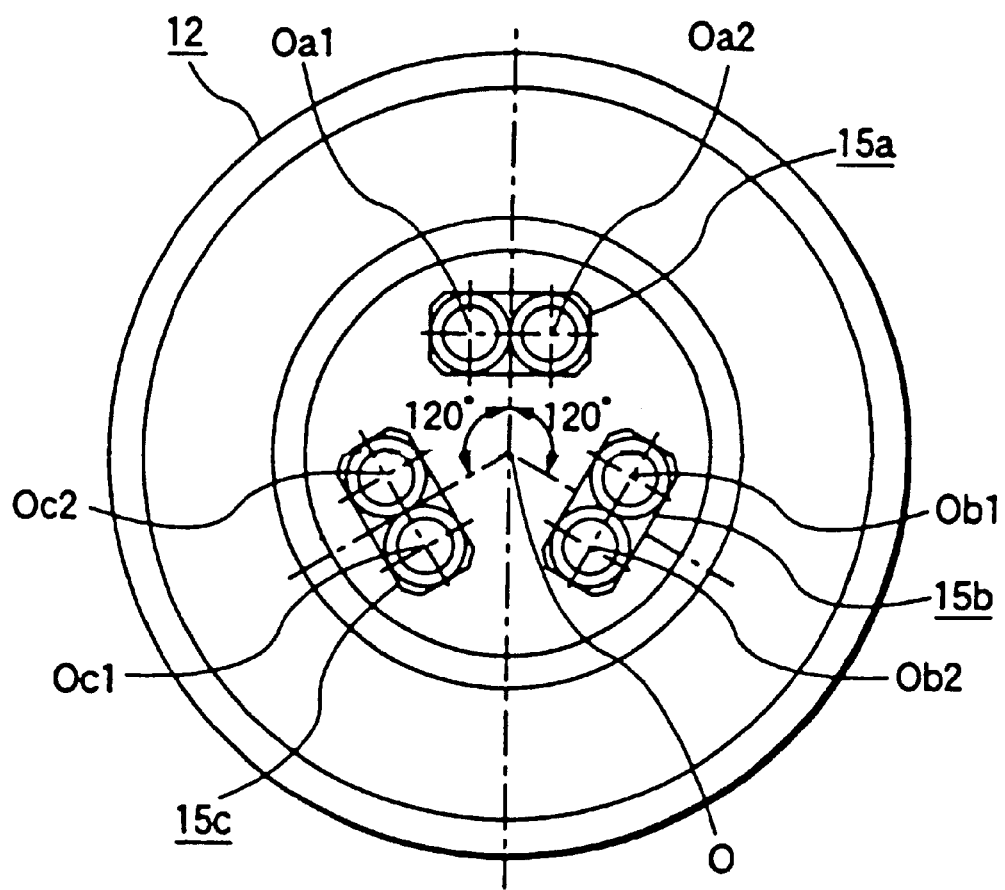
FIG. 26 is a plan view showing the configuration of the main unit of non-contact signal transmission apparatus according to the embodiment 3.

FIG. 26 is a plan view showing the configuration of the main unit 8A of non-contact signal transmission apparatus 8 according to the embodiment 3.

In the figure, a numeral 12 represents a power coil, 15a, 15b, 15c a signal coil for a control signal, a clock signal, and a video signal respectively. The signal coils are arranged every 120 degrees in the hollow section of the power coil 12 so that they may be symmetric three times that exceeds twice and arranged so that the two split cores may be at the same distance from the center O of the power coil 12.

Assuming the center of the power coil 12 as O, the centers of two split cores of the signal core 15a as Oa1 and Oa2 respectively, the centers of two split cores of the signal core 15b as Ob1 and Ob2 respectively, and the centers of two split cores of the signal core 15c as Oc1 and Oc2 respectively, the cores are arranged so that the distance between O and Oa1 may be equal to the distance between O and Oa2, that the distance between O and Ob1 may be equal to the distance between O and Ob2, and that the distance between O and Oc1 may be equal to the distance between O and Oc2, respectively.

Here, "to arrange so that they may be symmetric three times" refers to an arrangement so that the initial state may appear three times while the signal cores are turned 360 degrees around the center O of the power core 12.

In this embodiment also, power coils 12 and 40, signal coils 15a and 41a, signal coils 15b and 41b, and signal coils 15c and 41c respectively have the same shape and dimensions. On the camera (auxiliary unit) 3 and the cellular phone main unit 2, power coils and signal coils are paired and arranged respectively facing each other under the same position conditions.

Next, the operation of the non-contact signal transmission apparatus will be described.

Figure 27:
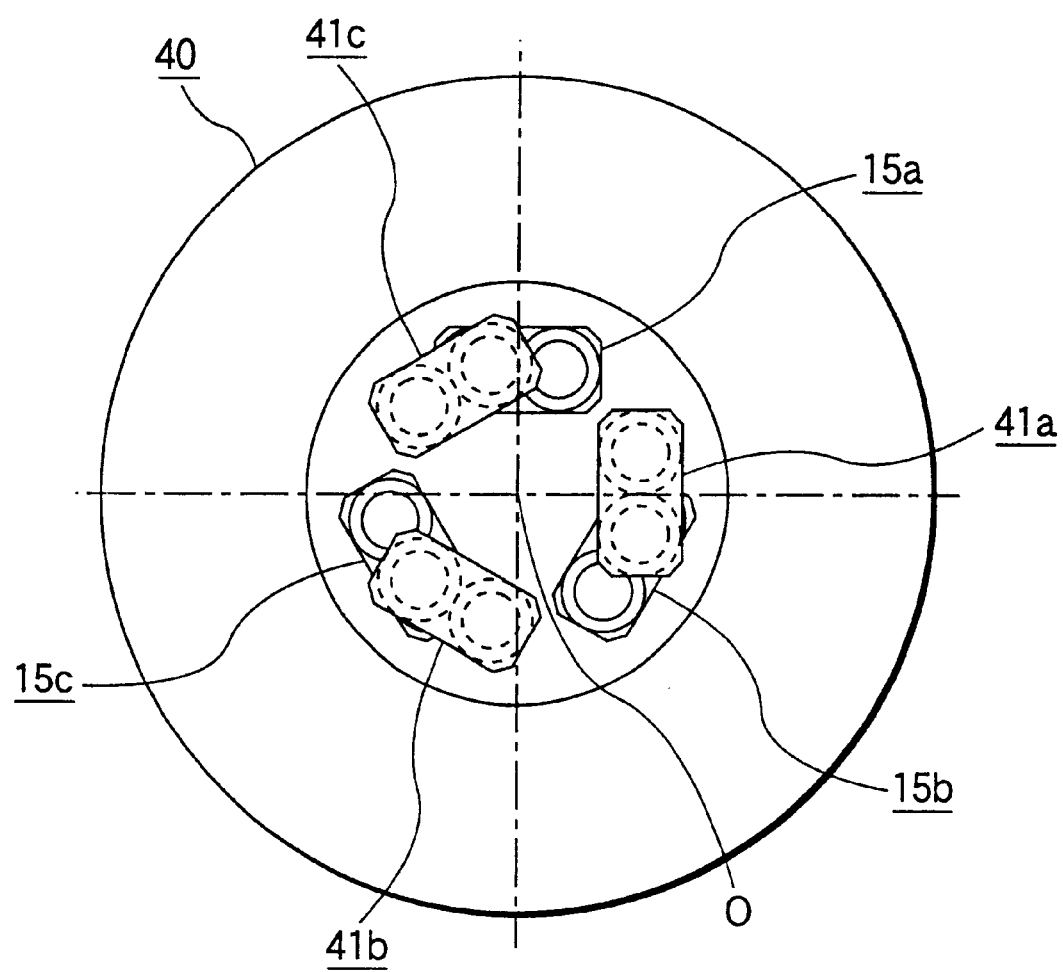
FIG. 27 is a plan view showing the positions of the coils of non-contact signal transmission apparatus according to the embodiment 3 with the camera (auxiliary unit) in a housed state (non-use state).
Figure 28:
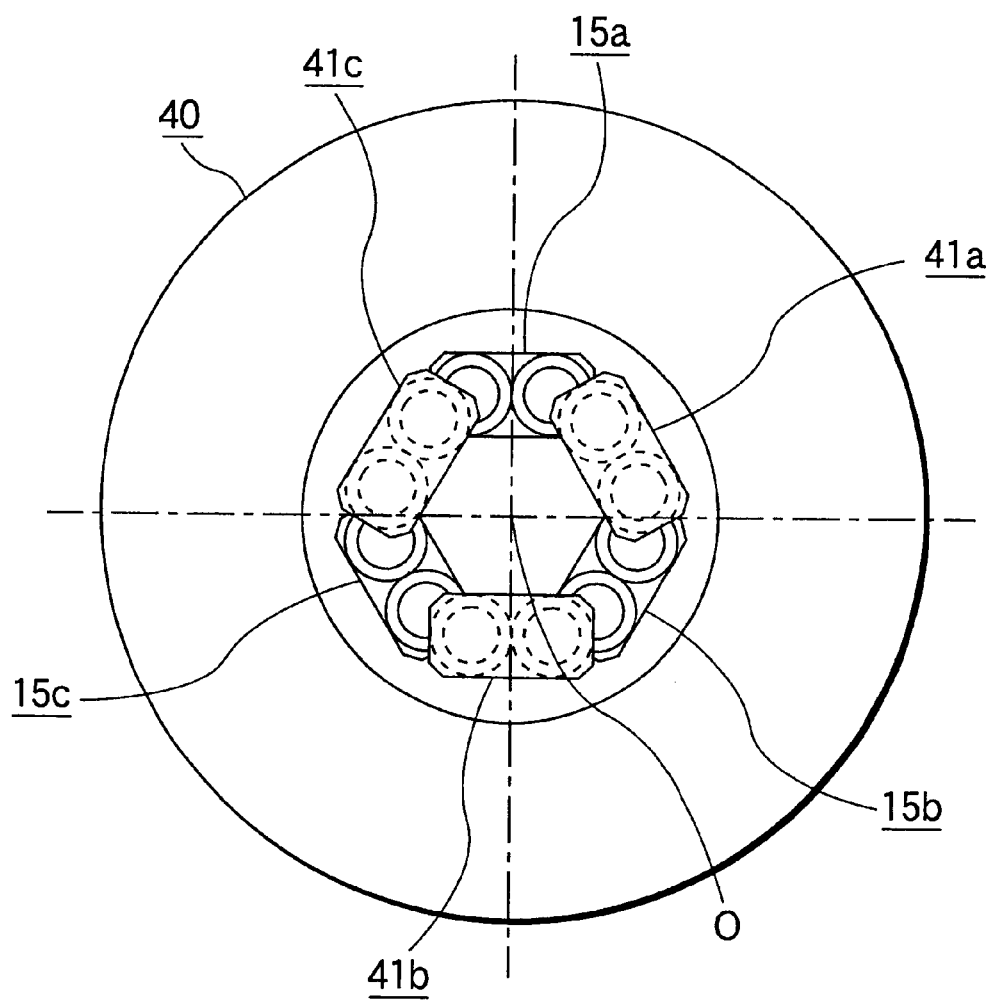
FIG. 28 is a plan view showing the positions of the coils of non-contact signal transmission apparatus according to the embodiment 3 with the camera (auxiliary unit) in another housed state (non-use state).

FIG. 27 is a plan view showing positions of the coils of the auxiliary unit 8B and the main unit 8A with the camera (auxiliary unit) 3 housed in the cellular phone main unit (main unit) 2.

As shown in the figure, in the state where the camera (auxiliary unit) 3 is housed in the cellular phone main unit (main unit) 2, paired signal coils on the camera (auxiliary unit) 3 and on the cellular phone main unit (main unit)2 are displaced from each other and are not completely aligned.

Meanwhile, when the camera (auxiliary unit) 3 is in a use state, the power coils 12 and 40, and three sets of signal coils 15a and 41a, 15b and 41b, 15c and 41c are alighted facing each other.

FIG. 27 shows the state where the power coil 40 and the signal coils 41a, 41b, 41c are turned by 90 degrees clockwise about the center of the power coil 40 from the position where camera 3 is in use.

In this state, only the power coils 12 and 40 of the cellular phone main unit 2 and the camera 3 are completely aligned. The signal coils of the camera 3 are displaced in respect to the paired three signal coils. The signal coils. 15a, 15b, 15c of the cellular phone main unit 2 are aligned only half with the signal coils 41c, 41a, 41b of the camera 3.

In this way, non-contact signal transmission apparatus according to the embodiment 3 of the invention, the signal coils 15a, 15b, 15c where wires are wound in the figure of eight to generate fluxes in opposite directions are arranged in the hollow section of the power coil 12. This enlarges the surface area of the power coil 12 thus providing stable power.

Similarly, on the auxiliary unit 8B, signal coils 41a, 41b, 41c where wires are wound in the figure of eight on the auxiliary unit 8B to generate fluxes in opposite directions are arranged in the hollow section of the power coil 40. This enlarges the surface area of the power coil 40 thus providing stable power.

Signal coils are arranged every 120 degrees on each of the main unit 8A and the auxiliary unit 8B under the same conditions. This provides the same level of crosstalk on signal coils thus facilitating correction in the electric circuit.

Further, the signal coils 15a, 15b, 15c or 41a, 41b, 41c where wires are wound in the figure of eight are arranged so that the two split cores may be at the same distance from the center of the power coil 12 or 40. This cancels the crosstalk from the power coil 12 or 40 to zero.

In the embodiment 3 the camera 3 is turned clockwise by 90 degrees when the camera 3 is to be housed in the cellular phone main unit 2. In case the distance from the center of rotation of the camera 3 to the lens 7 is increased and the angle of rotation is set to 60 degrees when the camera 3 is housed in the cellular phone main unit 2, the power coil 40 and the signal coils 41a, 41b, 41c also turns clockwise by 60 degrees about the center of the power coil 40 from the state where the camera 3 is in use.

In this state, the signal coils 15a, 15b, 15c are not aligned with the signal coils 41a, 41b, 41c of the camera 3 thus causing the signal transmission to be interrupted. This allows the user to know that the camera is in a housed state without a special position detector.

Embodiment 4

Figure 29:
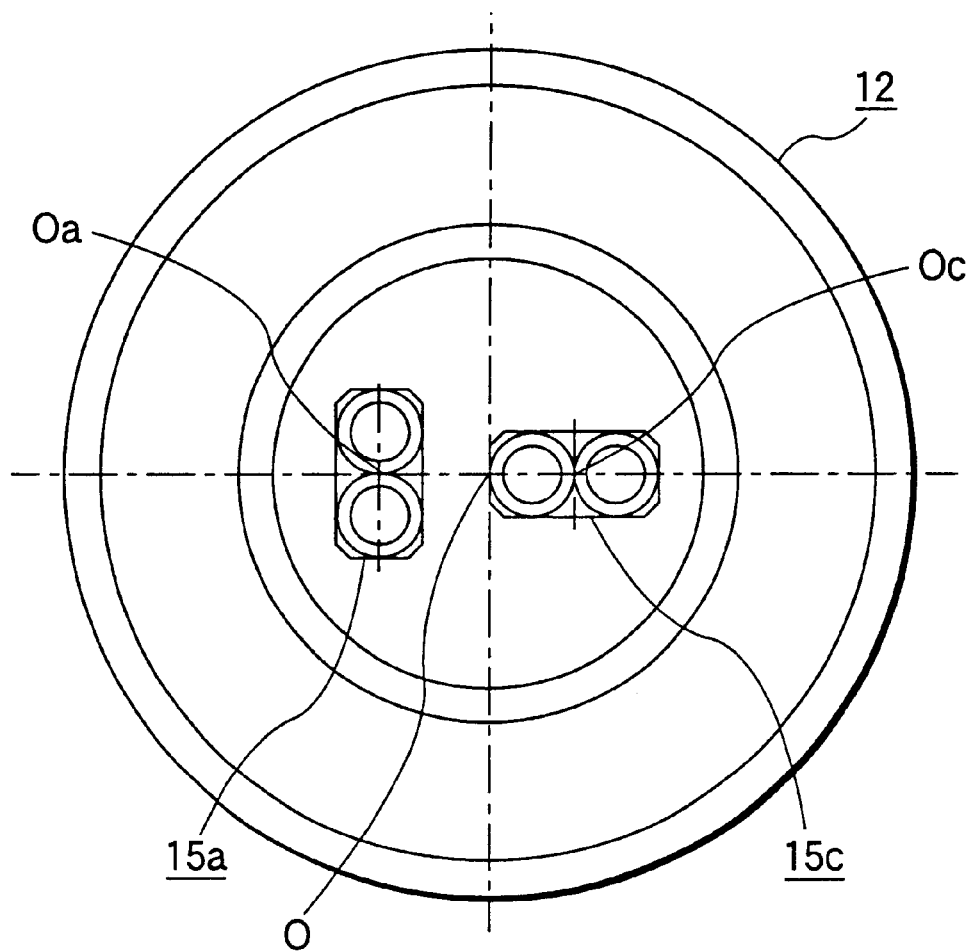
FIG. 29 is a plan view showing the configuration of the main unit of non-contact signal transmission apparatus according to the embodiment 4.

FIG. 29 is a plan view showing the configuration of the cellular phone main unit (main unit) 2 of non-contact signal transmission apparatus 8 according to the embodiment 4.

In the figure, a numeral 12 represents a power coil, 15a, a signal coil for a control signal, 15c a signal coil for a video signal. The signal coils are arranged at a right angle in the hollow section of the power coil 12 so that the straight line connecting the center Oa of the signal coil 15a and the center Oc of the signal coil 15c may pass the center O of the power coil 12.

Next, the operation of the non-contact signal transmission apparatus will be described.

Figure 30:
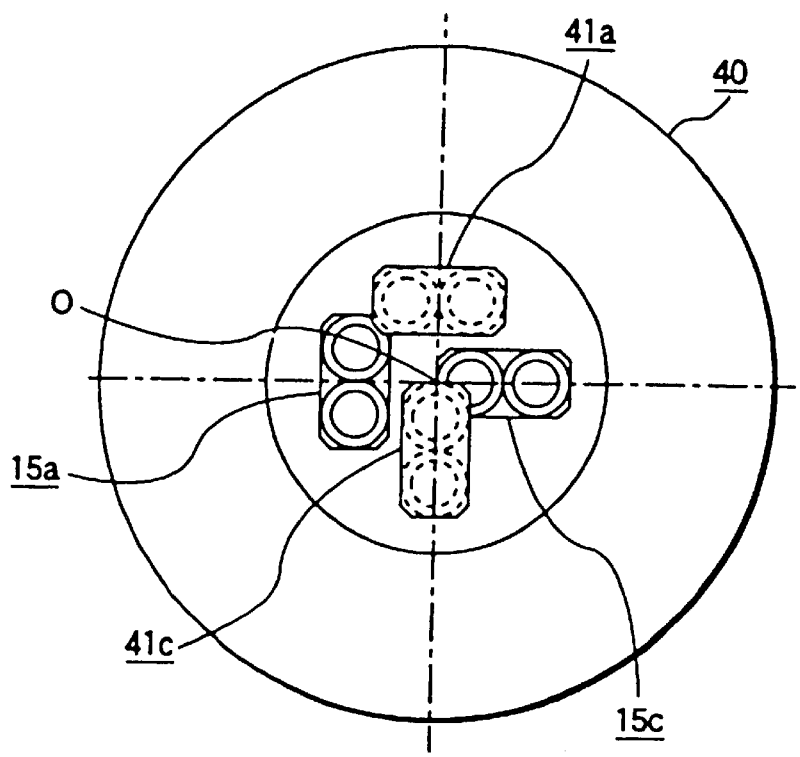
FIG. 30 is a plan view showing the positions of the coils of non-contact signal transmission apparatus according to the embodiment 4 with the camera (auxiliary unit) in a housed state (non-use state).

FIG. 30 is a plan view showing positions of the coils of the auxiliary unit 8B and the main unit 8A with the camera (auxiliary unit) 3 housed in the cellular phone main unit 2 (that is, in a non-use state).

Meanwhile, when the camera (auxiliary unit) 3 is in a use state, the power coils 12 and 40, and two sets of signal coils 15a and 41a, 15c and 41c are alighted facing each other.

In this embodiment also, power coils 12 and 40, signal coils 15a and 41a, and signal coils 15c and 41c respectively have the same shape and dimensions. On the camera (auxiliary unit) 3 and the cellular phone main unit 2, power coils and signal coils are paired and arranged respectively facing each other under the same position conditions.

In FIG. 30, the power coil 40 and the signal coils 41a, 41c on the camera (auxiliary unit) 3 are turned clockwise by 90 degrees the center O of the power coil 40 from the position where camera 3 is in use.

In this state, only the power coils 12 and 40 of the cellular phone main unit 2 and the camera 3 are completely aligned. The signal coils 41a, 41c of the camera 3 are displaced in respect to the paired signal coils 15a, 15c and are not aligned at all.

In this way, non-contact signal transmission apparatus according to the embodiment 4 of the invention, the signal coils 15a, 15c where wires are wound in the figure of eight to generate fluxes in opposite directions are arranged in the hollow section of the power coil 12. This enlarges the surface area of the power coil 12 thus providing stable power.

Similarly, on the auxiliary unit 8B, signal coils 41a, 41c where wires are wound in the figure of eight on the auxiliary unit 8B to generate fluxes in opposite directions are arranged in the hollow section of the power coil 40. This enlarges the surface area of the power coil 40 thus providing stable power.

On the main unit 8A, the two signal coils 15a, 15c are arranged at a right angle so that the straight line connecting the center of the signal coil 15a and the center of the signal coil 15c may pass the center of the power coil 12. This reduces crosstalk between the signal coils 15a and 15c to zero. Similarly, on the auxiliary unit 8B, the two signal coils 41a, 41c are arranged at a right angle so that the straight line connecting the center of the signal coil 41a and the center of the signal coil 41c may pass the center of the power coil 40. This reduces crosstalk between the signal coils 41a and 41c to zero.

When the camera (auxiliary unit) 3 is housed in the cellular phone main unit 2, two sets of signal coils at both ends, the signal coils 15a and 41a and the signal coils 15c and 41c do not face each other respectively, thus causing the signal transmission to be interrupted. This allows the user to know that the camera 3 is in a housed state without a special position detector. It is also possible to suspend power feeding from the cellular phone main unit 2 to the camera 3 or to automatically switch the cellular phone 1 to the camera non-use mode.

Embodiment 5

Figure 31:
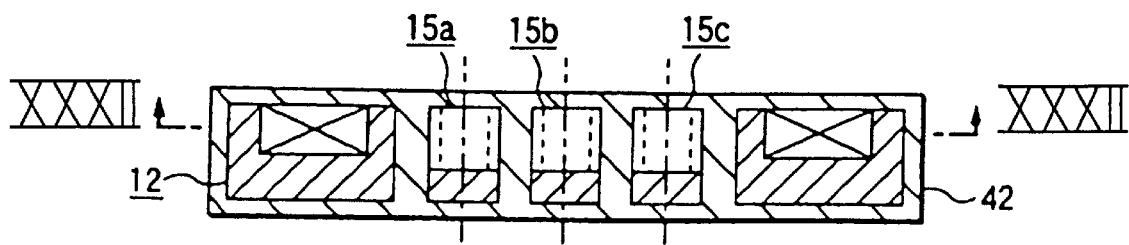
FIG. 31 is a cross-sectional view showing the configuration of the main unit of non-contact signal transmission apparatus according to the embodiment 5.
Figure 32:
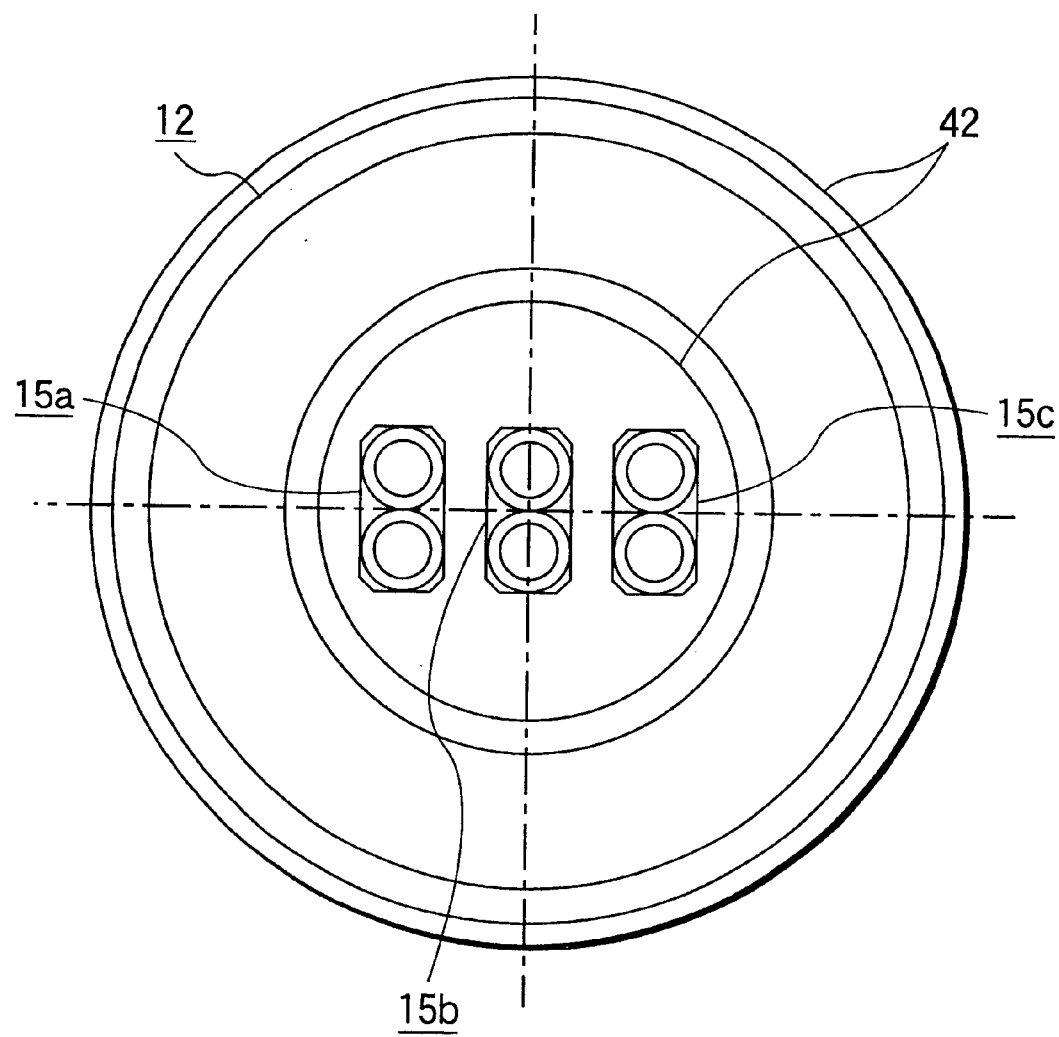
FIG. 32 is a cross-sectional view of FIG. 31 at section along line XXXII—XXXII.

FIG. 31 is a cross-sectional view of the main unit 8A of non-contact signal transmission apparatus 8 according to the embodiment 5. FIG. 32 is a cross-sectional view of FIG. 31 at section along line XXXII—XXXII.

In the figure, a numeral 42 represents an insulated mold resin such as epoxy resin that integrates the main unit 8A of non-contact signal transmission apparatus 8 according to the embodiment 1.

That is, the mold resin 42 coats the outer surface of the power coil 12 with a uniform thickness and fills the hollow section of the power coil 12 to integrate the power coil 12 and the signal coils 15a, 15b, 15c into a single module.

While not shown, the auxiliary unit 8B of non-contact signal transmission apparatus 8 according to this embodiment, same as the main unit 8A, uses the mold resin to integrate the power coil and the three signal coils to form a single module.

In this embodiment also, it is clear that power coils and signal coils that correspond with each other on the camera (auxiliary unit) 3 and the cellular phone main unit (main unit) 2 respectively have the same shape and dimensions. It is also clear that, on the camera (auxiliary unit) 3 and the cellular phone main unit (main unit) 2, power coils and signal coils are paired and arranged respectively facing each other under the same position conditions.

In this way, according to the embodiment 5, the power coil 12 and the signal coils 15a, 15b, 15c are integrated via mold resin coating on the main unit 8 and the auxiliary unit 8B of the non-contact signal transmission apparatus. This allows downsizing of the non-contact signal transmission apparatus 8 and prevents coils from being corroded or damaged even when dirt, dust or a water drop is attached, thereby enhancing reliability of connection.

When the camera (auxiliary unit) 3 is removed from the cellular phone main unit (main unit) 2, cores and coils as connection points are not exposed thus providing a low-profile look.

Embodiment 6

Figure 33:
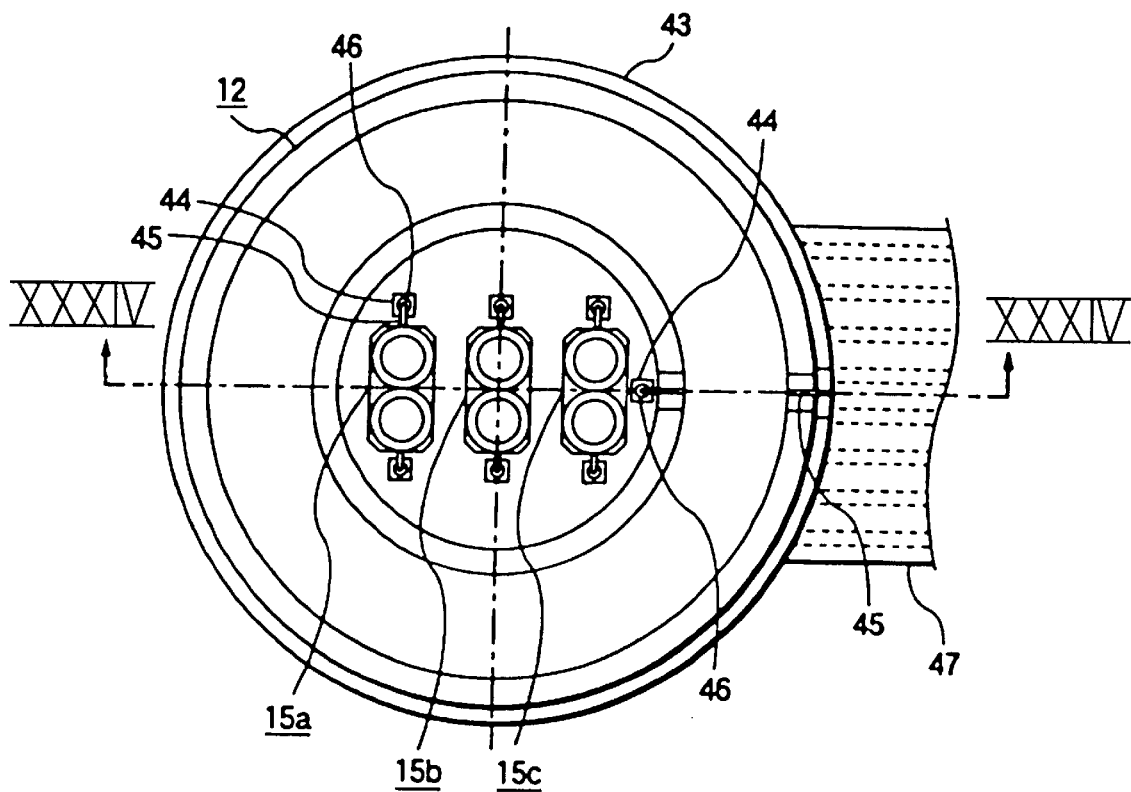
FIG. 33 is a plan view showing the configuration of the main unit of non-contact signal transmission apparatus according to the embodiment 6.
Figure 34:
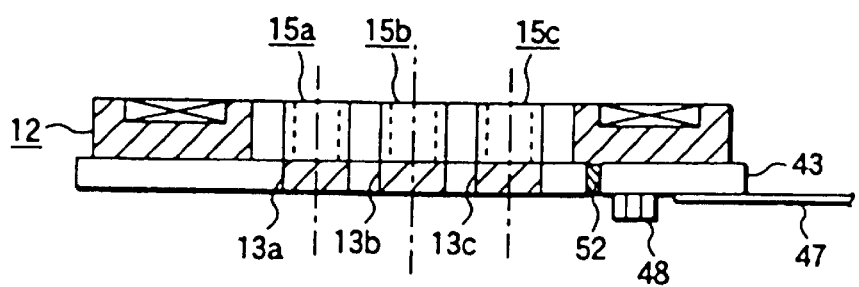
FIG. 34 is a cross-sectional view of FIG. 33 at section along line XXXIV—XXXIV.
Figure 35:
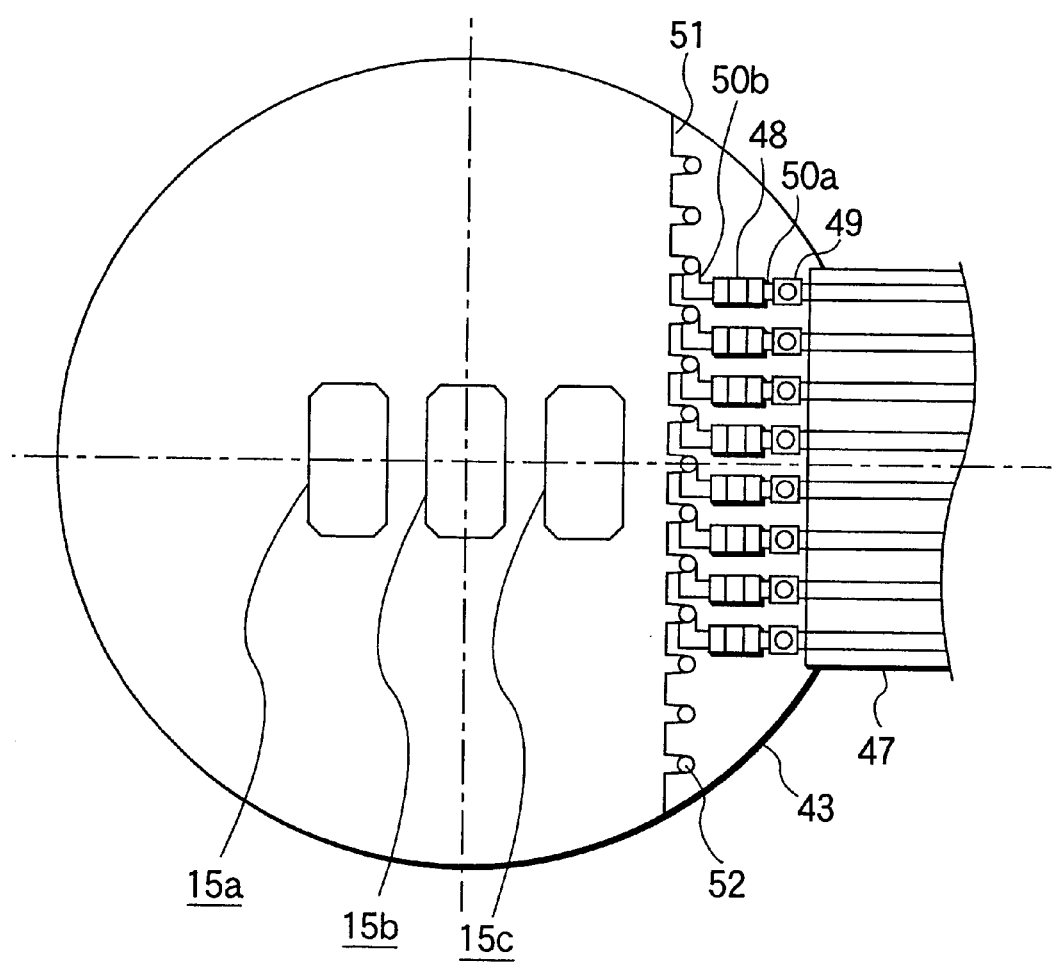
FIG. 35 is a rear view showing the configuration of the main unit of non-contact signal transmission apparatus according to the embodiment 6.

FIG. 33 is a plan view showing the main unit 8A of non-contact signal transmission apparatus 8 according to the embodiment 6. FIG. 34 is a cross-sectional view of FIG. 33 at section along line XXXIV—XXXIV. FIG. 35 is a rear view of the main unit 8A of the non-contact signal transmission apparatus 8 shown in FIG. 33.

In the figure, a numeral 43 represents a double-layer circuit board on the upper face of which is arranged a power coil 12 and in which the seating of the signal cores 13a, 13b, 13c is embedded, 44 a land provided on the upper face of the double-layer circuit board 43, 45 a wire connecting the power coil 12 or signal coils 15a, 15b, 15c with the land 44, 46 a through hole for connecting the land 44 with the wiring in the internal layer of the circuit board, 47 an FPC (Flexible Printed Circuit) for wiring the non-contact signal transmission apparatus 8 and an electric circuit (not shown).

A numeral 48 represents a chip capacitor arranged on the rear face of the double-layer circuit board 43 for guiding the an antenna signal propagated in the FPC 47 to the ground for feedback, 49 a through hole for introducing a signal from the FPC to the wiring in the inner layer of the circuit board, 50a and 50b wiring patterns on the rear face of the double-layer circuit board 43 that are connected only via the chip capacitor 48.

A numeral 51 represents a ground pattern for providing a ground on the rear face of the double-layer circuit board 43, 52 a ground through hole that passes from the upper face of the circuit board to the rear face of the circuit board and is connected to the ground pattern 51.

Figure 36:
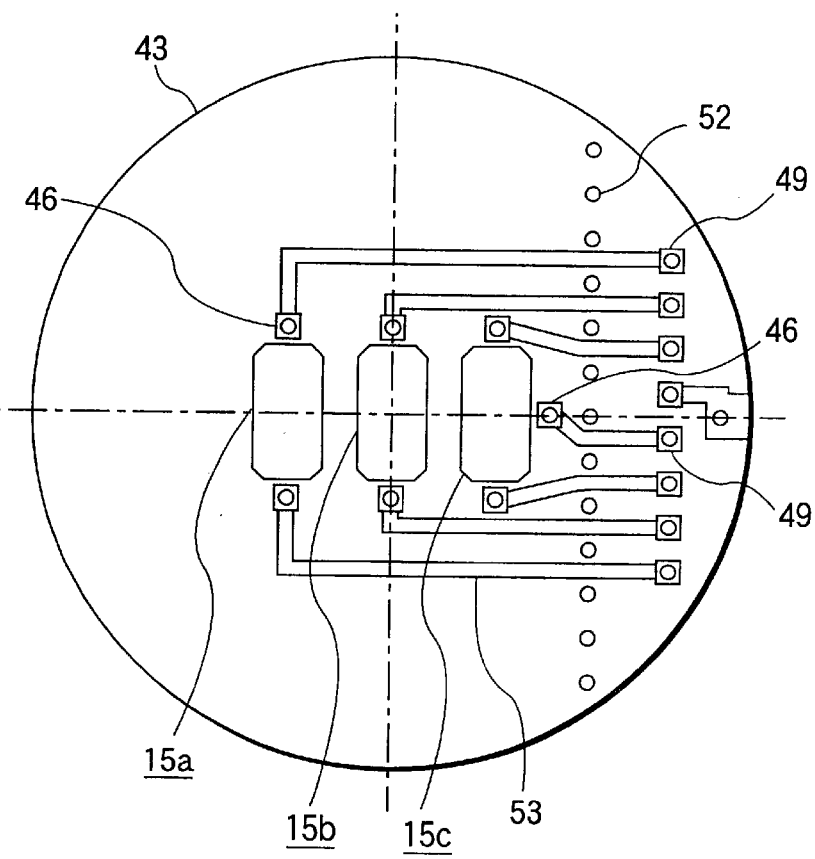
FIG. 36 is a diagram showing the wiring pattern on the inner layer of a double-layer circuit board in non-contact signal transmission apparatus according to the embodiment 6.

FIG. 36 shows the pattern on the inner layer of the double-layer circuit board 43. In FIG. 36, a numeral 53 represents a wiring pattern on the inner layer that connects the through holes 46 and 49.

Next, the operation of the non-contact signal transmission apparatus will be described.

In case power and various signals are transmitted from the cellular phone main unit (main unit) 2 to the camera (auxiliary unit) 3, a signal input from the FPC 47 shown in FIG. 35 is connected to from the rear face of the double-layer circuit board 43 to the wiring pattern on the inner layer shown in FIG. 36 via the through hole 49, directed to the upper face of the double-layer circuit board 43 via the through hole 46, then transmitted to the power coil 12 or the signal coils 15a, 15b, 15c by the wire 45 via the land 44 shown in FIG. 33.

When a signal from the camera (auxiliary unit) 3 is received by the cellular phone main unit (main unit) 2, the aforementioned signal transmission path is followed in the reverse direction.

Signal transmission between the cellular phone main unit (main unit) 2 and the camera (auxiliary unit) 3 is made via electromagnetic induction, same as in the embodiment 1. The corresponding description will be omitted.

The operation assumed in case an antenna signal has invaded the non-contact signal transmission apparatus 8 from the FPC 47.

An antenna signal invading the non-contact signal transmission apparatus 8 causes adverse effects on the signal transmission between the cellular phone main unit 2 and the camera 3 as well as degrades the input/output properties of the antenna.

In this embodiment as shown in FIGS. 34 and 35, a chip capacitor 48 whose resistance drops to zero in a high frequency band used by the antenna 6 is arranged on the rear face of the double-layer circuit board 43. An antenna 6 signal trying to invade via the FPC 47 is guided to the ground via the chip capacitor 48 and fed back to the antenna 6 in order to prevent invasion of an antenna signal. This reduces degradation in the electrical properties of the antenna 6.

Since the chip capacitor is arranged on the rear face of the circuit board, it is possible to arbitrarily arrange coils on the upper face of the circuit board and to enlarge the surface area of the power coil 12. Since its is possible to tailor the outline of the double-layer circuit 43 to the outer diameter of the power coil 12 thus allowing downsizing of the main unit 8A of the non-contact signal transmission apparatus 8.

While not shown, it is clear that the auxiliary unit 8B of non-contact signal transmission apparatus 8 according to this embodiment has the same structure as the main unit 8A and provides the same advantages.

Embodiment 7

Figure 37:
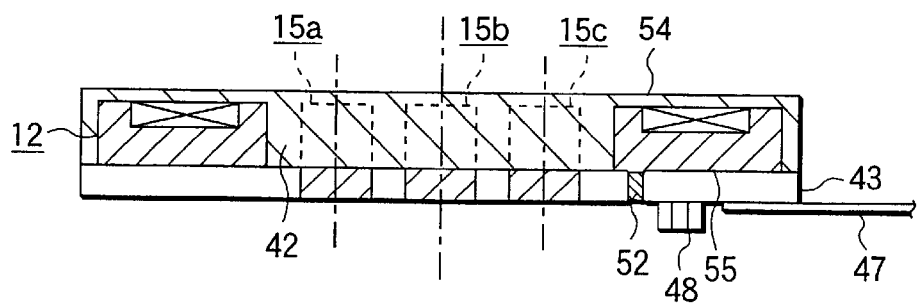
FIG. 37 is a cross-sectional view showing the configuration of the main unit of non-contact signal transmission apparatus according to the embodiment 7.
Figure 38:
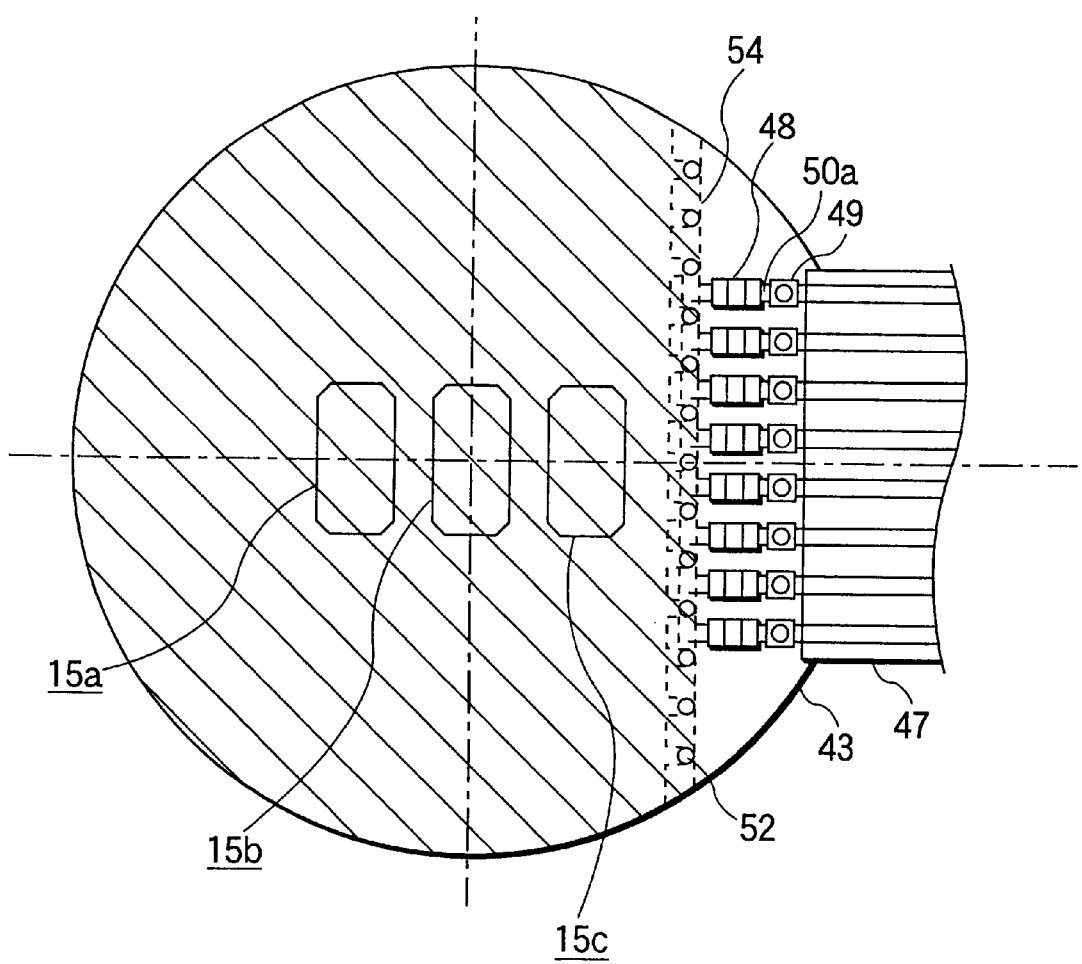
FIG. 38 is a rear view showing the configuration of the main unit of non-contact signal transmission apparatus according to the embodiment 7.

FIG. 37 is a cross-sectional view of the main unit 8A of non-contact signal transmission apparatus according to the embodiment 7. FIG. 38 is a rear view of FIG. 37.

In the figure, a numeral 42 represents an insulated mold resin such as epoxy resin that coats the upper face of the double-layer 43 on the main unit 8A (see FIG. 34) of non-contact signal transmission apparatus 8 according. to the embodiment 8 and integrates the main unit 8A into a single module.

A numeral 52 represent ground through holes provided to prevent an antenna signal invading from (make) the long and narrow space formed on the rear face of the double-layer circuit board 43 to connect the FPC 47. Interval of the ground through holes 52 to prevent invasion of an antenna signal depends on the frequency of the antenna signal in question. An interval of 1 to 2 mm is sufficient for a frequency of 2 GHz.

A numeral 54 represents a metallic thin film shield applied on the surface of the mold resin 42 and the areas excluding the FPC 47, the chip capacitor 48, the through hole 49 and the wiring pattern 50a of the side face and the rear face of the double-layer circuit board 43. The metallic thin film shield is formed with a thickness sufficient for preventing send/receive signals to/from the antenna 6 from invading the metallic thin film shield 54.

In case the metallic thin film shield 54 is made of copper, it is desirable that the thickness is a skin depth of 2 to 3 micrometer acting as a skin effect on the antenna 6, assuming an antenna frequency of about 2 GHz and a power transmission frequency of about 500 kHz.

It is clear that any other metal with a radio wave shielding effect, such as gold, silver and aluminum can be used and that the film thickness depends on metals because the skin depth differs from metal to metal.

A numeral 55 represents a copper plating applied on the upper face of the double-layer circuit board 43 and connected to the metallic thin film shield 54 on the rear face of the double-layer circuit board 43 via the ground through hole 52. This configuration shields all of the power coil 12 and the signal coils 15a, 15b, 15c in from invasion of radio waves. An antenna signal propagated via the air never invades the non-contact signal transmission apparatus 8 thereby causing no effects on the input/output properties of the antenna 6 and enhances the resistance against external radio interference.

While not shown, it is clear that the auxiliary unit 8B of non-contact signal transmission apparatus 8 according to this embodiment has the same structure as the main unit 8A and provides the same advantages.

Non-contact signal transmission apparatus according to the invention is characterized in that the apparatus performs signal transmission between a main unit and an auxiliary unit via electromagnetic induction in a non-contact state, wherein a set of power cores having hollow sections are provided as a pair at corresponding positions of a main unit and an auxiliary unit, wherein a wire is wound around each of power cores (power coils) for feeding power from the main unit to the auxiliary unit and at least one set of signal cores are provided as a pair at corresponding positions of the main unit and the auxiliary unit, wherein a wire is wound around each of signal cores (signal coils) for transmitting signals between the main unit and the auxiliary unit, the at least one set of signal coils arranged in the hollow section of the power core. This configuration has advantages that the main unit and the auxiliary unit are electromagnetically coupled in a non-contact state thus the auxiliary unit can be detachably attached to the main unit, that the facing area of the power coils of the main unit and the auxiliary unit can be enlarged, that power feeding from the main unit to the auxiliary unit is stabilized and the apparatus is more resistant to gap variations at the facing section, and that the flux density in the hollow section of the power coil can be set to a small value thus reducing crosstalk to the signal coil.

Signal coils of non-contact signal transmission apparatus according to the invention is characterized in that the signal coils use signal cores composed of a seating and two columnar cores formed on the seating of the main unit and the auxiliary unit to wind wires so that the directions of the magnetic flux may be opposite between the two columnar cores. This configuration has advantages that the interlinkage fluxes from the power coils are cancelled between the wires of the two columnar cores thus making the signal coils less susceptible to the influence of crosstalk from the power coils, that the leak flux from each signal coil is reduced, and that the influence of crosstalk between adjacent signal coils is reduced, thus allowing stable signal transmission.

Non-contact signal transmission apparatus according to the invention is characterized in that the apparatus comprises at least two sets of signal coils and arranges the signal coils so that they maybe geometrically symmetric at least twice with respect to the center of a power coil and arranges two columnar cores of each signal coil at the same distance from the center of the power coil. This configuration has an advantage that the crosstalk on the signal coil from the power coil can be substantially eliminated.

Non-contact signal transmission apparatus according to the invention is characterized in that the apparatus comprises at least two sets of signal coils and arranges the signal coils so that they maybe geometrically symmetric at least twice with respect to the center of a power coil and so that the distance from the center of the power coil to the center of each signal coil may be identical. This configuration has an advantage that the level of crosstalk on signal coils can be equalized thus facilitating correction in the electric circuit.

Non-contact signal transmission apparatus according to the invention is characterized in that the apparatus comprises at least two sets of signal coils and arranges the signal coils so that they may come at a right angle from each other and the straight line connecting the centers of coils may pass the center of the power coil. This configuration has an advantage that crosstalk is canceled to zero between adjacent signal coils.

Non-contact signal transmission apparatus according to the invention is characterized in that in a non-use state the apparatus is configured so that at least a set of signal coils of the main unit and the auxiliary unit may face each other in a dislocated state. This configuration has an advantage that signal transmission via at least one set of signal coils is interrupted or the level of a transmitted signal drops in case the auxiliary unit is not in use, thereby allowing automatic detection of the state where the auxiliary unit is not in use.

Non-contact signal transmission apparatus according to the invention is characterized in that the apparatus comprises power coils and signal coils integrated via mold resin into a module on the main unit and the auxiliary unit. This configuration has advantages that the apparatus can be downsized and that facing sections of the main unit and the auxiliary unit are not exposed thus it is possible to reliably transmit signals between the main unit and the auxiliary unit even in case dirt, dust or a water drop is attached.

Non-contact signal transmission apparatus according to the invention is characterized in that the apparatus comprises an antenna for transmitting/receiving signals to/from outside on the main unit, arranges power coils and signal coils on the upper surface of a printed circuit board of the main unit and the auxiliary unit, comprises a printed circuit board having wiring patterns to the power coil and the signal coil and an FPC (Flexible Printed Circuit) for transmitting signals to the power coil and the signal coil, and arranges chip capacitors for grounding an antenna signal propagated via the FPC to a ground for feedback at the rear surface of the printed circuit board. This configuration has advantages that degradation in electrical properties of the antenna can be reduced, that the size of the circuit board can be made substantially identical with the outer diameter of the power coil thus allowing downsizing of the non-contact signal transmission apparatus, and that the degrees of freedom of wiring pattern on the circuit board is enhanced.

Non-contact signal transmission apparatus according to the invention is characterized in that the apparatus comprises power coils and signal coils and a printed circuit board integrated via mold resin into a module shielded with a metallic coating of a predetermined thickness, excluding the chip capacitors, on the main unit and the auxiliary unit. This configuration has advantages that the input/output properties of the antenna is not affected and that the apparatus is less susceptible to external radio interference.

Non-contact signal transmission apparatus according to the invention is characterized in that the main unit is a cellular phone and the auxiliary unit is a camera. This configuration has an advantage that it is possible to attach a camera as an auxiliary unit to a cellular phone as a main unit in a detachable way in a non-contact state (without electric wiring between the cellular phone and the camera) and to realize a portable information terminal that can reliably transmit power and signals between the cellular phone and the camera through a simple configuration.

What is claimed is:

1. A non-contact signal and power transmission apparatus for signal and power transmission between a main unit and an auxiliary unit via electromagnetic induction without contact, said non-contact signal and power transmission apparatus comprising:

first and second power coils for feeding power from a main unit to an auxiliary unit, each of said first and second power coils having a power core with a hollow and a wire wound around said power core, pairs of said first and second power coils being located at corresponding positions of the main unit and of the auxiliary unit, respectively, and at least one pair of signal coils for transmitting signals between the main unit and the auxiliary unit, each signal coil having a signal core and a wire wound around said signal core, said signal coils being located at corresponding positions of the main unit and of the auxiliary unit, respectively, wherein at least one pair of said signal coils is located in corresponding hollows of said power cores of said first and second power coils.

2. The non-contact signal and power transmission apparatus according to claim 1, wherein each of said signal cores includes a seating and two columnar cores located on said seating in each of the main unit and the auxiliary unit, so that directions of magnetic fluxes produced by said first and second signal coils including said columnar signal cores are opposite from each other between said two columnar cores.

3. The non-contact signal and power transmission apparatus according to claim 2, comprising:

at least two pairs of said first and second signal coils, wherein said pairs of signal coils are symmetrically arranged in the main unit and the auxiliary unit with respect to a center of said power coils in the corresponding main unit and auxiliary unit, and said two columnar cores of each of said signal coils in the main unit and in the auxiliary unit are equidistant from the center of the corresponding power coils in said main unit and in said auxiliary unit.

4. The non-contact signal and power transmission apparatus according to claim 2, comprising at least two pairs of said signal coils, wherein said pairs of signal coils are symmetrically arranged with respect to a center of one of said first and second power coils, and centers of said signal coils are equidistant from the center of one of said power coils.

5. The non-contact signal and power transmission apparatus according to claim 2, comprising two pairs of said signal coils, wherein said pairs of signal coils have respective central axes that are at a right angle to each other, and straight lines connecting centers of each of said signal coils pass through a center of one of said first and second power coils.

6. The non-contact signal and power transmission apparatus according to claim 1, wherein, in a non-use state of the auxiliary unit, at least a pair of said signal coils of the main unit and of the auxiliary unit face each other but are not directly opposite each other.

7. The non-contact signal and power transmission apparatus according to claim 1, including a molded resin integrating said first and second power coils and said signal coils into modules on the main unit and on the auxiliary unit.

8. The non-contact signal and power transmission apparatus according to claim 1, comprising:

an antenna, for transmitting and receiving signals, on the main unit, first and second printed circuit boards having wiring patterns connected to one of said first and second power coils and one of said signal coils, top surfaces of said first and second power coils and said signal coils being located on the main unit and on the auxiliary unit, respectively, a Flexible Printed Circuit (FPC) for transmitting signals to said power coils and said signal coils, and chip capacitors for grounding an antenna signal propagated via the FPC to a ground for feedback, located at a rear surface of one of said first and second printed circuit boards.

9. The non-contact signal and power transmission apparatus according to claim 8, including a molded resin integrating said first and second power coils, said signal coils, and said printed circuit boards into respective modules, and a metallic coating on said modules, excluding said chip capacitors, on the main unit and on the auxiliary unit.

10. The non-contact signal and power transmission apparatus according to claim 1, wherein the main unit is a cellular phone, and the auxiliary unit is a camera.

11. The non-contact signal and power transmission apparatus according to claim 1, wherein each of said first and second power coils includes a pair of power cores and wire wound around said power cores, and each of said signal coils includes first and second signal cores and wire wound around said first and second signal cores.

* * * * *